US008986094B2

(12) United States Patent
Hornik et al.

(10) Patent No.: US 8,986,094 B2
(45) Date of Patent: Mar. 24, 2015

(54) DISTRIBUTED BONUS FEATURE

(75) Inventors: Jeremy M. Hornik, Chicago, IL (US); Larry J. Pacey, Northbrook, IL (US); Alfred Thomas, Las Vegas, NV (US); Martin R. Ugarte, Chicago, IL (US)

(73) Assignee: WMS Gaming, Inc., Waukegan, IL (US)

( * ) Notice: Subject to any disclaimer, the term of this patent is extended or adjusted under 35 U.S.C. 154(b) by 0 days.

(21) Appl. No.: 13/597,097

(22) Filed: Aug. 28, 2012

(65) Prior Publication Data

US 2013/0130782 A1 May 23, 2013

Related U.S. Application Data

(60) Provisional application No. 61/528,481, filed on Aug. 29, 2011.

(51) Int. Cl.
*G06F 13/00* (2006.01)
*G07F 17/32* (2006.01)

(52) U.S. Cl.
CPC .................................. *G07F 17/3267* (2013.01)
USPC ............................................... 463/16; 463/27

(58) Field of Classification Search
CPC ............................. G07F 17/3258; G07F 17/34
USPC ................................................ 463/16, 42, 31
See application file for complete search history.

(56) References Cited

U.S. PATENT DOCUMENTS

| | | | | |
|---|---|---|---|---|
| 6,015,344 | A | 1/2000 | Kelly et al. | |
| 6,110,042 | A | 8/2000 | Walker et al. | |
| 6,113,098 | A | 9/2000 | Adams | |
| 6,165,071 | A | 12/2000 | Weiss | |
| 6,193,608 | B1 | 2/2001 | Walker et al. | |
| 6,231,445 | B1 * | 5/2001 | Acres | 463/42 |
| 6,364,765 | B1 | 4/2002 | Walker et al. | |
| 6,575,832 | B1 | 6/2003 | Manfredi et al. | |
| 6,758,757 | B2 | 7/2004 | Luciano et al. | |
| 6,780,111 | B2 | 8/2004 | Cannon et al. | |
| 6,800,027 | B2 | 10/2004 | Giobbi et al. | |
| 6,811,486 | B1 | 11/2004 | Luciano | |
| 6,923,721 | B2 | 8/2005 | Luciano et al. | |
| 7,182,690 | B2 | 2/2007 | Giobbi et al. | |
| 7,354,343 | B2 | 4/2008 | Schugar et al. | |

(Continued)

OTHER PUBLICATIONS

U.S. Appl. No. 13/546,862, filed Jul. 11, 2012, Allen, Jeffrey L., et al.

(Continued)

*Primary Examiner* — Reginald Renwick
(74) *Attorney, Agent, or Firm* — DeLizio Gilliam, PLLC

(57) ABSTRACT

Systems and operations for a distributed bonus game feature for wagering game systems are disclosed. In one example, a wagering game may award a bonus game to a player. A delay period is set for the bonus game. The delay period and other details regarding the bonus game are persistently stored on a paper ticket or in a database on a wagering game server. The bonus game may be initiated (after the delay period) on a different wagering game machine than the machine that awarded the bonus game. In a second example, funding for a bonus game for a player may be determined in accordance with a random number generator on a wagering game machine currently occupied by a player. If the player moves to a different machine, output from a random number generator on the new machine may be used to determine continued funding for the bonus game.

19 Claims, 16 Drawing Sheets

(56) References Cited

U.S. PATENT DOCUMENTS

| | | | | |
|---|---|---|---|---|
| 7,384,337 | B2 | 6/2008 | Thomas | |
| 7,682,244 | B1 | 3/2010 | Luciano et al. | |
| 7,758,421 | B2 | 7/2010 | Hornik et al. | |
| 8,187,089 | B2 * | 5/2012 | Englman et al. | 463/25 |
| 2002/0093136 | A1 | 7/2002 | Moody | |
| 2002/0177479 | A1 | 11/2002 | Walker et al. | |
| 2003/0064797 | A1 * | 4/2003 | Jackson et al. | 463/25 |
| 2003/0078101 | A1 | 4/2003 | Schneider et al. | |
| 2005/0215318 | A1 * | 9/2005 | Seelig et al. | 463/31 |
| 2005/0239542 | A1 * | 10/2005 | Olsen | 463/27 |
| 2006/0003829 | A1 * | 1/2006 | Thomas | 463/20 |
| 2006/0079316 | A1 | 4/2006 | Flemming et al. | |
| 2006/0079317 | A1 | 4/2006 | Flemming et al. | |
| 2006/0111170 | A1 * | 5/2006 | Hornik et al. | 463/16 |
| 2006/0128460 | A1 | 6/2006 | Muir et al. | |
| 2007/0093299 | A1 | 4/2007 | Bergeron et al. | |
| 2007/0218975 | A1 * | 9/2007 | Iddings et al. | 463/25 |
| 2008/0188296 | A1 * | 8/2008 | Seelig et al. | 463/27 |
| 2009/0011835 | A1 | 1/2009 | Hansen et al. | |
| 2009/0203447 | A2 | 8/2009 | Hensen et al. | |
| 2009/0327060 | A1 | 12/2009 | Arezina et al. | |
| 2010/0248818 | A1 | 9/2010 | Aoki et al. | |
| 2011/0065496 | A1 | 3/2011 | Gagner et al. | |
| 2011/0143834 | A1 | 6/2011 | Guinn et al. | |

OTHER PUBLICATIONS

"FarmVille", *Wikipedia* http://en.wikipedia.org/wiki/Farmville Date Obtained from the Internet: Jan. 9, 2012 Last Date Modified: Dec. 27, 2011 , 6 pages.

"Simulation Video Game", *Wikipedia* http://en.wikipedia.org/wiki/Simulation_video_game Date Obtained from the Internet: Jan. 9, 2012 Last Date Modified: Jan. 4, 2012 , 3 pages.

"Social Network Game", *Wikipedia* http://en.wikipedia.org/wiki/Social_network_game Date Obtained from the Internet: Jan. 9, 2012 Last Date Modified: Jan. 3, 2012 , 4 pages.

"Zynga Connectin the World Through Games", http://company.zynga.com Date Obtained from the Internet: Jan. 9, 2012 2012 , 1 page.

* cited by examiner

700

FIG. 11
GOOD NEWS!
Your crops are getting rain
Look for EXTRA CREDITS when you trigger the CASH CROP FARM BONUS!
PRESS TO CONTINUE
WIN
60
CREDITS
9595
BET
50

1100

1300

DISTRIBUTED BONUS FEATURE

RELATED APPLICATIONS

This application claims the priority benefit of U.S. Provisional Application Ser. No. 61/528,481 filed Aug. 29, 2011

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2012, WMS Gaming, Inc.

FIELD

Embodiments of the inventive subject matter relate generally to wagering game systems, and more particularly to wagering game systems that distribute bonus game functionality across multiple wagering game machines.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes example wagering game machine architectures. The third section describes example operations performed by some embodiments and the fourth section describes example wagering game machines in more detail. The fifth section presents some general comments.

Introduction

This section provides an introduction to some embodiments of the invention. In general, the embodiments distribute the funding, presentation, or execution of a bonus game across multiple wagering game machines. In some embodiments, a bonus game may be awarded on a first wagering game machine. The bonus game is not immediately started; rather a delay period is determined. After the delay period, the bonus game may be started on the same or a different wagering game machine to determine a bonus award or reveal a previously determined bonus award. In alternative embodiments, funding for a bonus game is received based on portions of wagers a player makes on multiple wagering game machines. A visual layer provides updates on the progress of the bonus game on the wagering game machine that the player is currently using.

Figure 1:
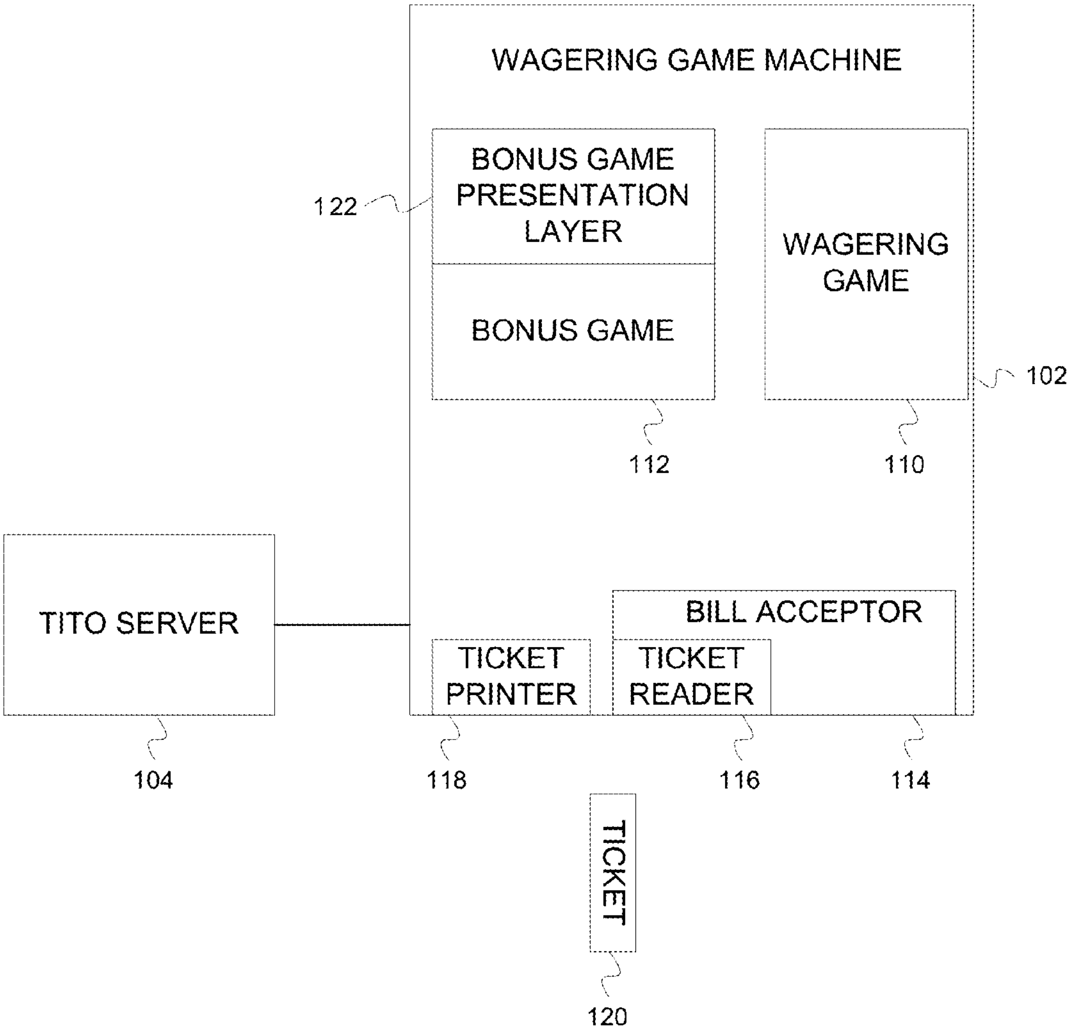
FIG. 1 is a block diagram of a distributed bonus system according to embodiments.

FIG. 1 is a block diagram of a distributed bonus system 100. In some embodiments, distributed bonus system 100 includes a wagering game machine 102 and a ticket in/ticket out (TITO) server 104. Wagering game machine 102 can be an electromechanical wagering game machine configured to play wagering games 110. Wagering games 110 can be a mechanical slots game. Alternatively, wagering game 110 can be an electronic wagering game including video casino games, such as blackjack, slots, keno, poker, blackjack, roulette, etc.

Wagering game machine 102 is also configured to present a bonus game 112. In general, a bonus game 112 is a game that may be initiated upon the presence of certain randomly generated conditions in a wagering game 110. For example, the presence of a particular game symbol in a particular position in a slots based wagering game 110 may trigger the execution of a bonus game 112. Bonus game 112 may provide opportunities for a player to win credits, multipliers, free spins, or other awards. Bonus game 112 may continue a theme for a base wagering game 110 or it may have a different theme.

Bonus game 112 includes a presentation layer 122. Presentation layer 122 includes the screen images that are displayed for the bonus game while the bonus game is operating. The presentation layer 122 may be displayed on any screen available to a wagering game machine 102. In some embodiments, presentation layer 122 is displayed on a top box display of wagering game machine 102.

Wagering game machine 102 includes a ticket printer 118 and bill acceptor 114. Ticket printer 118 prints a paper ticket 120 that include a bar code indicating a cash value for the ticket. In general, a paper ticket 120 is printed when a player decides to leave a wagering game machine with credits remaining on a credit meter of the wagering game machine.

The paper ticket 120 may be used for play on other wagering game machines or redeemed for the cash value of the ticket at a ticket redemption machine or casino cage.

Bill acceptor 114 receives cash currency that is exchanged for credits used for wagering on the wagering game machine. In some embodiments, bill acceptor 114 includes a ticket reader 116. Ticket reader 116 reads tickets that have been previously printed by ticket printers on wagering game machines. In alternative embodiments, ticket reader 116 may be a separate unit from bill acceptor 114.

TITO server 104 tracks the issuance and redemption of tickets dispensed from wagering game machines. When a ticket 120 is printed, it is assigned a unique identifier. The ticket printer prints a code (typically a bar code) that includes the unique identifier and the cash value of the ticket. In addition, wagering game machines transmit the unique identifier and cash value for the ticket to TITO server 104. When the ticket is presented for redemption at a wagering game machine, the ticket is scanned and the unique identifier is transmitted to TITO server 104, which marks the ticket as having been redeemed. This prevents the ticket from being redeemed more than one time.

In some embodiments, a distributed bonus presentation or feature is implemented using printed tickets. In some embodiments, a distributed bonus game may optionally be triggered when a player cashes out credits on a wagering game machine 102. The triggering of a bonus game may be randomly determined using a random number generator. In response to the trigger event, a paper ticket is printed that includes data regarding the cash value of the ticket based on the credits remaining on the wagering game machine, and also includes data regarding the bonus game. The data regarding the bonus game includes a delay period that must pass before the bonus game can be presented. The delay period is designed to encourage the player to return to the casino in order play the bonus game and receive award amounts, if any, associated with the bonus game. The delay period may be relative (e.g., "6 hours from now") or it may be absolute (e.g., 7:00 p.m.) In some embodiments, the wagering game machine determines a bonus amount at the time the bonus game is triggered. The bonus amount is also encoded onto the ticket.

Figure 2:
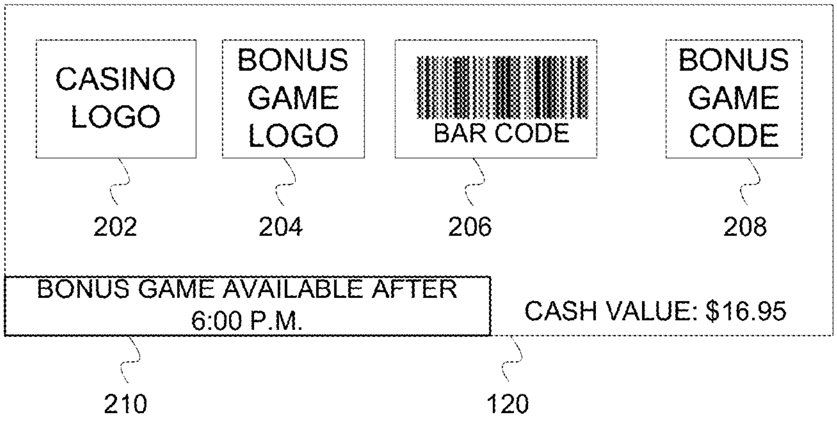
FIG. 2 illustrates a sample ticket having bonus game information encoded on the ticket.

FIG. 2 illustrates a sample ticket 120 having bonus game information encoded on the ticket. In some embodiments, ticket 120 includes a bar code 206 that identifies the ticket and the cash value of the ticket. Ticket 120 also includes a bonus game code 208 that identifies a bonus game and a delay period for the bonus game. In some embodiments, a bonus amount is also encoded in bonus game code 208. Bonus game code 208 may be a second bar code similar to bar code 206. Alternatively, bonus game code 208 may be a two dimensional bar code or a QR (Quick Response) code. Ticket 120 may also include a time indicator 210 that informs the ticketholder when the bonus game will be available.

Ticket 120 may include other features such as casino logo 202 and bonus game logo 204. Casino logo 202 is a logo associated with the casino where the ticket was printed. Bonus game logo 204 is a logo associated with the bonus game encoded on the ticket. For example, if the theme of the bonus game is a fish based game (e.g., a bonus game in which fish symbols are used) the logo may be a fish.

Returning to FIG. 1, when a player inserts a ticket 120 having bonus game information encoded on the ticket, a wagering game machine reads the ticket to determine the cash value of the ticket. Additionally, in some embodiments, the ticket is held in the ticket reader 118 in order to read the bonus game code 208. The delay period is determined from the bonus game code, and if the player attempts to redeem the ticket before the delay period, the bonus game may be forfeited in some embodiments.

Alternatively, if the delay period has passed, then the bonus game may be started. In some embodiments, the bonus award amount is determined prior to printing ticket 120. In such embodiments, the bonus award amount is encoded into bonus game code 208. When the bonus game is played, the bonus game generates graphical output to presentation layer 122 that corresponds to the previously determined bonus award amount. The presentation layer is then displayed on a video display of wagering game machine 102.

As an example of the above, assume that a player has cashed out and during the cash out process, the wagering game machine randomly determines that the player is to be awarded a fish themed bonus game. Further assume that the wagering game machine randomly determines a bonus award amount of $16.00. After the delay period, the player returns to the casino and inserts the ticket into a wagering game machine. After validating the ticket with TITO server 104, the wagering game machine initiates the fish themed bonus game. During the fish themed bonus game, fish may interact with objects (e.g., eat objects, swim through objects) that provide individual object bonus amounts. The individual object bonus amounts may be randomly determined. Thus for example, the fish may interact with four objects having values of $3.00, $8.00, $4.00 and $1.00. The total of the individual object bonus amounts will equal the bonus award amount that was determined when the ticket was printed, in this example $16.00.

It is possible that the player will insert a ticket awarding a bonus game into a wagering game machine that doesn't support the bonus game. Similarly, the player may redeem the ticket at a casino cage. If the delay period has passed, the player may be awarded the bonus amount without presentation of the bonus game. The bonus award amount may be redeemed as additional credits on a wagering game machine or additional cash received at a casino cage.

In some embodiments, a bonus amount is determined when a ticket having a bonus game code encoded on the ticket is inserted into a wagering game machine that supports presentation of the bonus game. In such embodiments, after the ticket is validated, the bonus game starts and bonus amounts may be randomly determined during the operation of the bonus wagering game.

Figure 3:
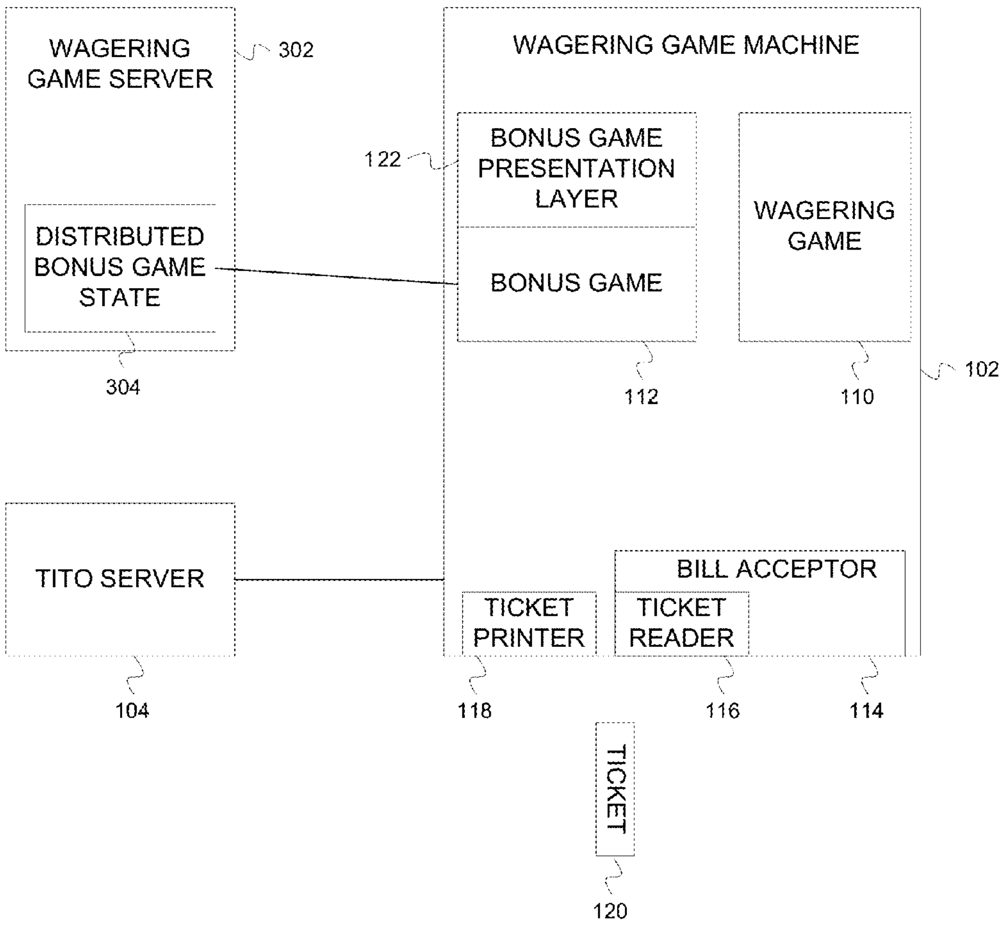
FIG. 3 is a block diagram of a distributed bonus system according to alternative embodiments.

FIG. 3 is a block diagram of a distributed bonus system 300. In some embodiments, system 200 includes wagering game machine 102, TITO server 104 and wagering game server 302. The functions of wagering game machine 102 and TITO server 104 are the same as described above with reference to FIG. 1.

Wagering game server 302 provides various services to wagering game machines 102. For example, wagering game server 302 provides accounts for players. The accounts may be used to store persistent state information for wagering games that have been played. The persistent state information may include information regarding bonus games that have been unlocked, achievement levels in games etc. Additionally, wagering game server 302 may store the state of a distributed bonus game in distributed bonus game state 304. Such state information may include a ticket identifier, a bonus game time, and in some embodiments, a bonus award amount.

The operation of wagering game system 300 will now be described. In some embodiments, when a player decides to cash out at a wagering game machine a ticket 120 is printed. In addition, the wagering game machine randomly determines if the player is to be awarded a bonus game. If a bonus game is awarded, the ticket identifier is transmitted to wagering game server 302 and the ticket identifier is stored in distributed bonus game state 304. Ticket 120 may contain indicia that the bonus game has been awarded, for example using bonus game logo 204 and time indicator 210.

If the ticketholder inserts the ticket into a wagering game machine after the time delay period, the wagering game machine queries distributed bonus game state 304 to determine if the ticket identifier is associated with a bonus game. If the ticket identifier is associated with a bonus game, the wagering game machine begins execution of the bonus game. In embodiments where the bonus award amount is determined when the player cashed out and the ticket was printed, the bonus award amount is retrieved from distributed bonus game state 304. When the bonus game is played, the bonus game generates graphical output to presentation layer 122 that corresponds to the previously determined bonus award amount. The presentation layer is then displayed on a video display of wagering game machine 102. In alternative embodiments where the bonus amount is determined when a ticket having a bonus game code encoded on the ticket is inserted into a wagering game, the bonus game starts and bonus amounts may be randomly determined during the operation of the bonus wagering game.

Although FIGS. 1-3 describe some embodiments, the following sections describe many other features and embodiments.

Example Operations

This section describes operations associated with some embodiments of the invention. In the discussion below, the flow diagrams will be described with reference to the block diagrams presented above. However, in some embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments; one or more of the operations can be performed in parallel. Moreover, some embodiments can perform less than all the operations shown in any flow diagram.

Figure 4:
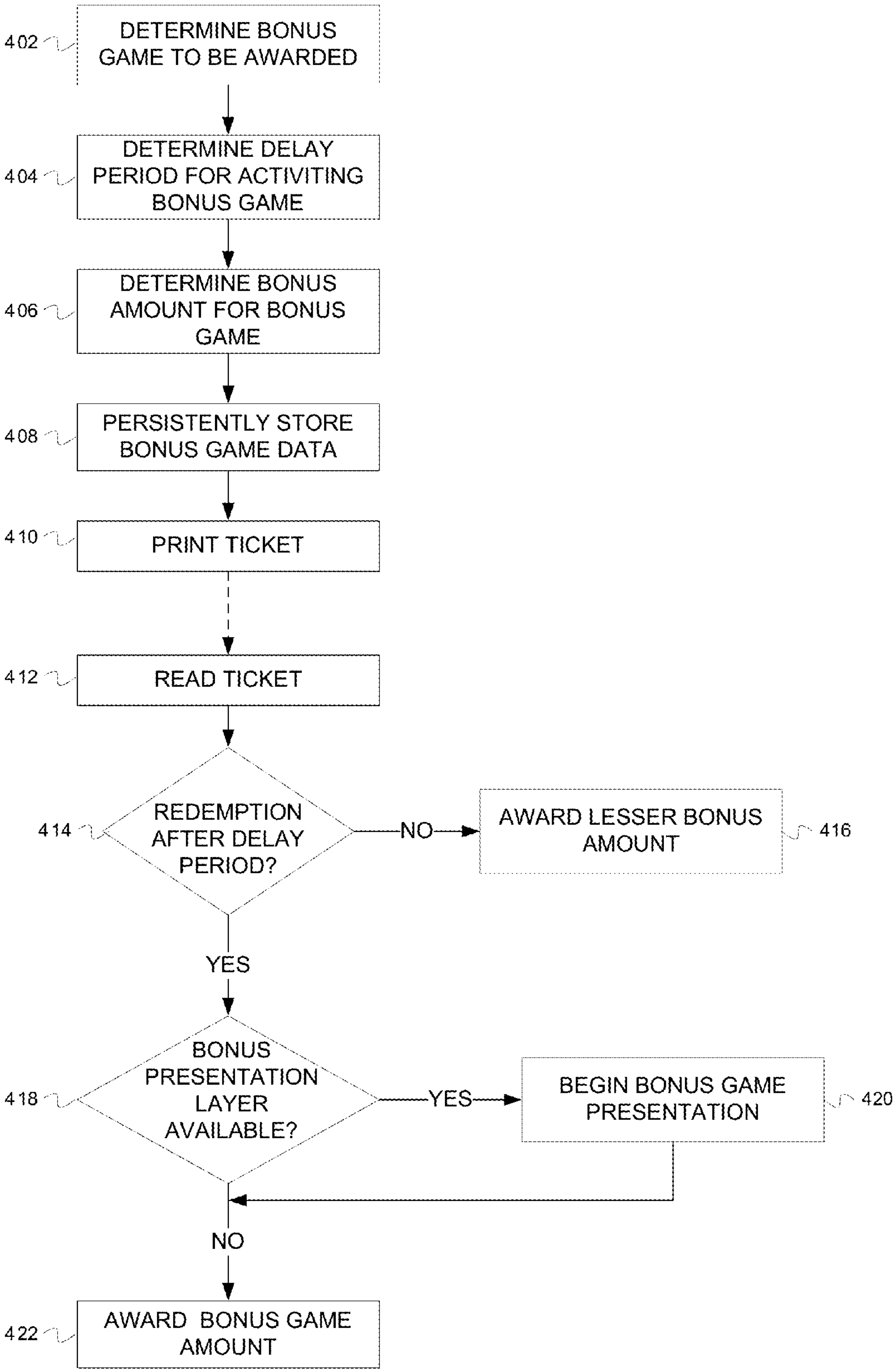
FIG. 4 is a flowchart illustrating a method for distributing a bonus game across multiple machines according to embodiments.

FIG. 4 is a flowchart illustrating a method 400 for distributing a bonus game across multiple machines. The method begins at block 402 by determining that a bonus game is to be awarded to a player. In some embodiments, the determination is made when the player cashes out at a wagering game machine. The output of a random number generator may be used to determine whether a player is awarded a bonus game upon cash out. Other conditions may be used to determine to award the bonus game. For example, the player may be awarded a bonus game if the player has wagered more than a threshold amount during game play. Alternatively, the player may be awarded a bonus game at cash out if the player has experienced a loss at the wagering game machine that exceeds a threshold amount.

In alternative embodiments, a determination that a player is to be awarded a bonus game at cash out may be made prior to the cash out. The determination may be made according to an aspect of game play, for example, the appearance of a game symbol in a reel of the wagering game during game play.

At block 404, a delay period is determined for the bonus game. The delay period provides a time interval that must pass before the bonus game can be started. The delay period may be configurable by a casino operator. Additionally, the delay period may be, at least in part, determined according to the output of a random number generator.

At block 406, some embodiments determine a bonus amount for the bonus game. In such embodiments, the bonus amount is determined before the bonus game presentation starts, and the presentation that may occur later reveals the bonus amount to the player. The bonus amount may be determined according to the output of a random number generator. In alternative embodiments, the bonus amount is not determined until the bonus game presentation is started (after the delay period). In these alternative embodiments, the operations of block 406 are not necessary.

At block 408 the wagering game persistently stores bonus game data for the bonus game. The bonus game data includes the delay period determined at block 404. In some embodiments, the bonus game data may include the bonus amount to be awarded when the bonus game is initiated after the delay period. In further embodiments, the bonus game data may also include a secondary bonus amount that is awarded if the player attempts to redeem the ticket before the delay period has expired. The secondary bonus amount is less than the amount the player would have received if the player waits to redeem the ticket after the delay period.

In some embodiments, bonus game data is persistently stored on a paper ticket. The wagering game machine creates a code such as a bar code, 2D bar code, QR code or other code that is capable of encoding data. The code is then printed on the paper ticket. In addition, the delay period may also be printed in human readable format so that the player knows when the bonus game may be started.

In alternative embodiments, the bonus game data is persistently stored on a server, for example, in bonus game state data 304 on wagering game server 302. In such embodiments the bonus game data, in addition to the data described above, includes a ticket identifier used by a TITO server to uniquely identify the paper ticket within the system. The paper ticket need not include any specialized encoding related to the bonus game.

At block 410, the ticket is printed and provided to the player.

At some point in time after the ticket is printed, the ticket is inserted into a wagering game machine ticket reader. The wagering game machine can be a different wagering game machine than the machine that printed the ticket.

At block 412, the wagering game machine reads data from the ticket. If there is not bonus game data encoded on the ticket, the wagering game machine treats the ticket as an ordinary paper ticket having a cash value usable for credits, and the method may terminate at this point. Alternatively, if there is bonus game data encoded on the ticket, the wagering game machine reads the bonus game data from the ticket, including the delay period and if present, a bonus game amount.

At block 414, the wagering game machine determines if the ticket insertion occurred after the delay period.

If the ticket was inserted prior to the delay period expiring, then in some embodiments, at block 416 the player may be awarded a bonus amount that is less than the full amount that would have been awarded had the delay period passed. In alternative embodiments, the player may forfeit the bonus amount entirely if the ticket is presented prior to the expiration of the delay period. In further alternative embodiments, the wagering game machine may provide a warning to the user that the delay period has not passed and provide the opportunity to retrieve the paper ticket for later use.

Alternatively, if the delay period has passed, then in some embodiments, a check is made at block 418 to determine if a presentation layer is available for the bonus game. A presentation layer may not be available if the wagering game machine does not support the bonus game indicated on the paper ticket. If a bonus game presentation layer is not available, then in some embodiments, the method proceeds to block 422 and awards the bonus amount to the player without presenting a bonus game.

If a bonus game presentation layer is available on the wagering game machine, then at block 420, the bonus game is presented to the user. In some embodiments, the bonus amount was determined when the ticket was printed. In such embodiments, the bonus game presentation amounts to a presentation that reveals bonus amount to the player. In alternative embodiments, the bonus amount is not determined until the presentation of the bonus game.

At block 422, the bonus amount is awarded to the user, typically in the form of credits on the credit meter of the wagering game machine.

Figure 5:
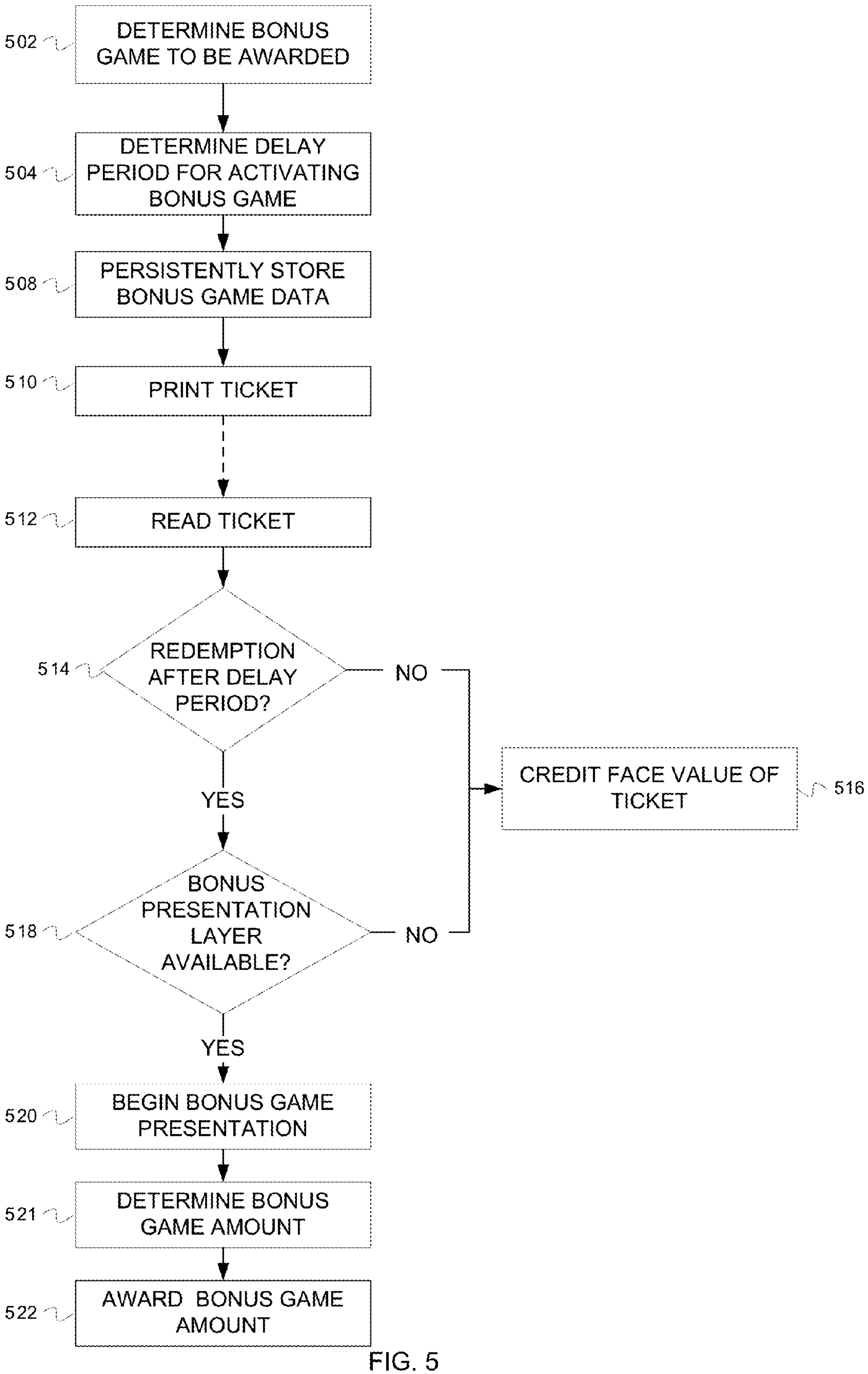
FIG. 5 is a flowchart illustrating a method for distributing a bonus game across multiple machines according to alternative embodiments.

FIG. 5 is a flowchart illustrating a method 500 for distributing a bonus game across multiple machines according to alternative embodiments. Some aspects of the method illustrated in FIG. 5 are similar to that described above in FIG. 4, however in method 500, determination of a bonus amount is deferred. Like method 400, method 500 begins at block 502 by determining that a bonus game is to be awarded to a player. The determination may be made when the player cashes out at a wagering game machine. The output of a random number generator may be used to determine whether a player is awarded a bonus game upon cash out. Other conditions may be used to determine to award the bonus game. For example, the player may be awarded a bonus game if the player has wagered more than a threshold amount during game play. Alternatively, the player may be awarded a bonus game at cash out if the player has experienced a loss at the wagering game machine that exceeds a threshold amount.

In alternative embodiments, a determination that a player is to be awarded a bonus game at cash out may be made prior to the cash out. The determination may be made according to an aspect of game play, for example, the appearance of a game symbol in a reel of the wagering game during game play.

At block 504, a delay period is determined for the bonus game. The delay period provides a time interval that must pass before the bonus game can be started. The delay period may be configurable by a casino operator. Additionally, the delay period may be, at least in part, determined according to the output of a random number generator.

At block 508 the wagering game persistently stores bonus game data for the bonus game. The bonus game data includes the delay period determined at block 504. In some embodiments, bonus game data is persistently stored on a paper ticket. The wagering game machine creates a code such as a bar code, 2D bar code, QR code or other code that is capable of encoding data. The code is then printed on the paper ticket. In addition, the delay period may also be printed in human readable format so that the player knows when the bonus game may be started.

In alternative embodiments, the bonus game data is persistently stored on a server, for example, in bonus game state data 304 on wagering game server 302. In such embodiments the bonus game data, in addition to the data described above, includes a ticket identifier used by a TITO server to uniquely identify the paper ticket within the system. The paper ticket need not include any specialized encoding related to the bonus game.

At block 510, the ticket is printed and provided to the player.

At some point in time after the ticket is printed, the ticket is inserted into a wagering game machine ticket reader. As in method 400, the wagering game machine can be a different wagering game machine than the machine that printed the ticket.

At block 512, the wagering game machine reads data from the ticket. If there is not bonus game data encoded on the ticket, the wagering game machine treats the ticket as an ordinary paper ticket having a cash value usable for credits, and the method may terminate at this point. Alternatively, if there is bonus game data encoded on the ticket, the wagering game machine reads the bonus game data from the ticket, including the delay period.

At block 514, the wagering game machine determines if the ticket insertion occurred after the delay period.

If the ticket was inserted prior to the delay period expiring, then the method proceeds to block 516, where the player is credited with the cash value of the ticket. In some embodiments, the wagering game machine may provide a warning to the user that the delay period has not passed and provide the opportunity to retrieve the paper ticket for later use prior to redeeming the face value of the ticket.

Alternatively, if the delay period has passed, then in some embodiments, a check is made at block 518 to determine if a presentation layer is available for the bonus game. A presentation layer may not be available if the wagering game machine does not support the bonus game indicated on the paper ticket. If a bonus game presentation layer is not available, then in some embodiments, the method proceeds to block 516 and credits the player with the face value of the ticket without presenting a bonus game.

If a bonus game presentation layer is available on the wagering game machine, then at block 520, the player is credited with the face value of the ticket and in addition, a bonus game is presented to the user.

At block 521, the system determines a bonus game amount to award to the player. The bonus game amount may be determined in accordance with the output of a random number generator.

At block 522, the bonus game amount is awarded to the user, typically in the form of credits on the credit meter of the wagering game machine.

The discussion above has involved embodiments providing bonus games where the determination that a bonus game is to be awarded and the presentation of the bonus game may be distributed across multiple wagering game machines. Embodiments where the funding and the presentation of bonus game are distributed across multiple wagering game machines are discussed below.

Distributed Funding and Presentation of Bonus Games

Figure 6:
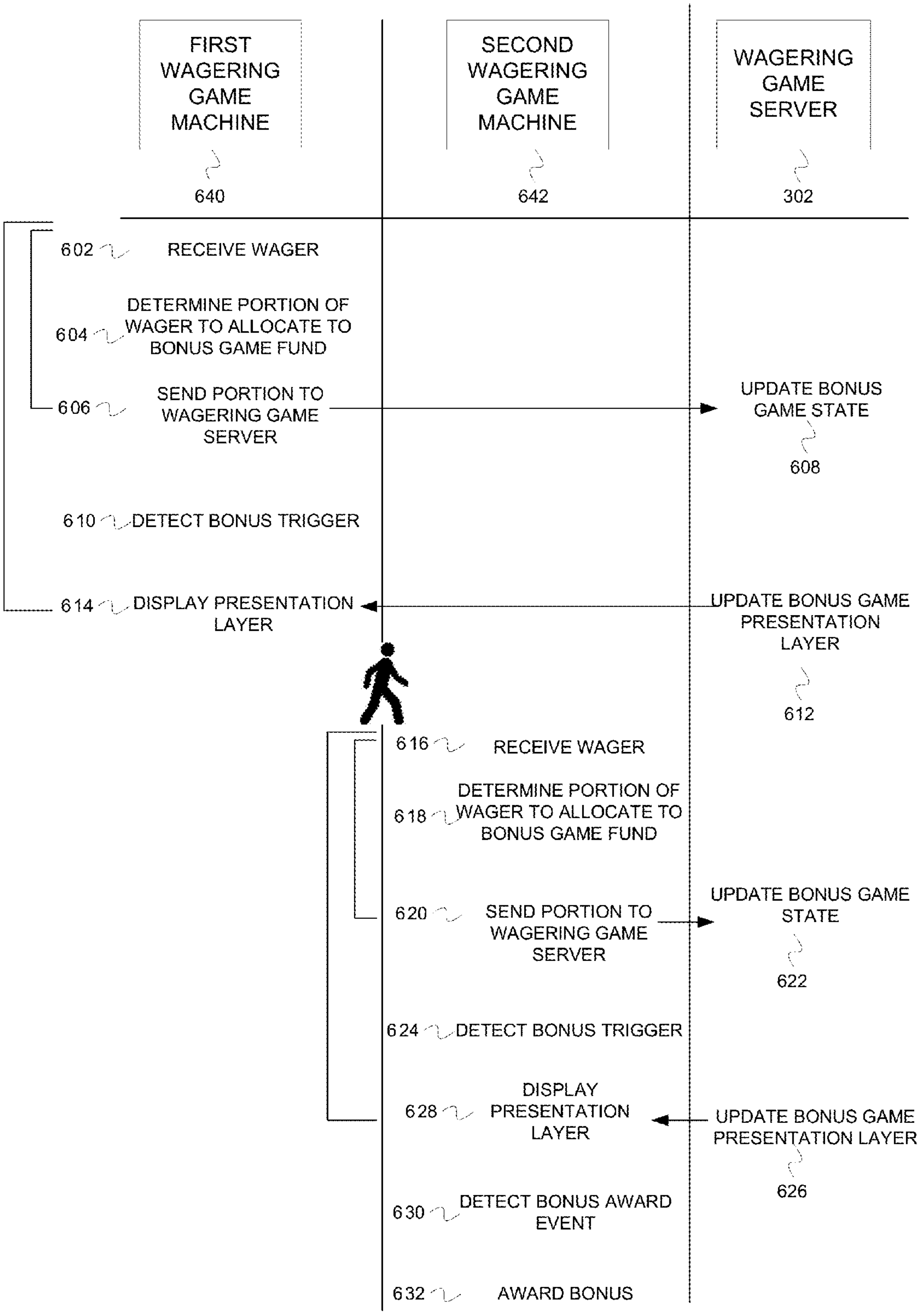
FIG. 6 is a flow diagram illustrating components of a system and the operations and data flow for a method executed by the components of the system that provides distributed funding and presentation of bonus games.

FIG. 6 is a flow diagram illustrating components of a system and the operations and data flow for a method executed by the components of the system that provides distributed funding and presentation of bonus games. The discussion will illustrate an example involving two wagering game machines 640 and 642, and a wagering game server 302. Those having skill in the art having the benefit of the disclosure will appreciate that any number of additional wagering game machines could be involved in the operation of a distributed funding and presentation of bonus games.

Wagering game machines 640 and 642 may be any type of wagering game machine in a casino. Wagering game machines 640 and 642 may have the capabilities of wagering game machine 102 described above; however wagering game machines 640 and 642 do not require a ticket printer or bill validator. Wagering game machines 640 and 642 are communicably coupled to wagering game server 302 by a network (not shown). The network may be a network within a casino, a private network connecting multiple casinos owned by a casino operator, or the Internet.

A method for distributing funding and presentation of a bonus game begins at operation 602 with receiving a wager at a first wagering game machine 640.

At operation 604, first wagering game machine 640 determines a portion of the wager that is to be used to fund a bonus game for the player. The bonus fund may be personal to the player and associated with a player identification such as a player tracking identifier or an account identifier in an account based wagering system. Alternatively, the bonus fund may be associated with a particular bonus game and is not personal to a player.

In some embodiments, first wagering game machine 640 uses the output of a random number generator to determine if a portion of the wager is to be used to contribute to a bonus game fund. The output may be from a separate invocation of a random number generator and thus different from the output used to determine the outcome of the wagering game. Alternatively, the output may be from a random number generator dedicated to determining outcomes for use in determining if a portion of a wager is to be allocated to a bonus game fund. The output may be used in various ways to determine if a portion of the wager is to be used to contribute to a bonus game fund and the amount to be contributed (if any). In some embodiments, the output is used to determine if a contribution is to be made. If a contribution is to be made, then the amount of the contribution may be a fixed contribution, a contribution that is relative to the wager amount, or a contribution that is randomly determined as a percentage of the wager. In alternative embodiments, a contribution may be made with each wager, with the contribution amount determined according to the output of the random number generator.

At operation 606, first wagering game machine 640 sends data indicating the portion of the wager that is allocated to the bonus game fund to wagering game server 302.

At operation 608, wagering game server 302 receives the data indicating the portion of the wager to be allocated to the bonus game fund. Bonus game state data 304 (FIG. 3) is updated to indicate the new bonus game fund amount.

Operations 602-608 may be repeated as the player continues to wager at wagering game machine 640.

At some point while the player is playing first wagering game machine 640, a bonus trigger event may occur. In some embodiments, the bonus trigger event comprises the appearance of one or more game symbols that are designated as bonus trigger symbols. The appearance of the game symbols may be determined as an output of a random number generator. In alternative embodiments, a mystery bonus trigger is used. In such embodiments, a mystery bonus trigger event is defined, but the event trigger is not revealed to the user. Upon occurrence of the event, a bonus game is commenced and displayed to the user.

In response to the bonus trigger event, at operation 612, wagering game server 302 updates a presentation layer for the bonus game. As discussed above, the presentation layer comprises graphical elements in a scene that is displayed to the player while the bonus game is active. Typically the bonus game has a theme and the elements that are in the presentation layer are consistent with the theme. For example, a bonus game that has a fish theme may have graphical elements representing fish, underwater plants and other elements found in or near water. A bonus game with a farm based theme may have a presentation layer having graphical elements representing items found on a farm such as various crops, barns, tractors etc. Many other themes are possible and within the scope of the inventive subject matter.

In some embodiments, elements within the presentation layer may have elements and element attributes that are adjusted according to the size of the bonus game fund. For example, in a fish based game, fish may be added to an underwater scene. The fish may grow as the bonus fund grows. In a farm based game, crops may appear to grow as the bonus fund grows. In a racing themed game, cars may appear to progress around a track as the bonus fund grows. Size, color, texture, position, orientation and shape are among the attributes of graphical elements in a presentation layer that may change as the bonus fund changes. Those of skill in the art having the benefit of the disclosure will appreciate that other attributes are possible and within the scope of the inventive subject matter.

Updates to the presentation layer may be continuous, or they may be done in a stepwise fashion. For example, in some embodiments, each addition to a bonus game fund may cause an attribute to change. In alternative embodiments, change may be stepwise in that a change to an attribute is made only when the bonus game fund amount crosses certain thresholds. The updated presentation layer is then sent to the wagering game.

At operation 614, first wagering game machine 640 receives the updated presentation layer. If the bonus game is still active on the wagering game machine, the wagering game displays the presentation layer on a display of the wagering game machine. In some embodiments, the presentation layer is displayed on a top box display of the wagering game machine.

Operations 602-614 may be repeated as the player continues to place wagers at first wagering game machine 640. At some point in time, the player stops playing at first wagering game machine 640 and begins wagering at a second wagering game machine 642. The time between stopping play at one wagering game machine (e.g., first wagering game machine 640) and beginning play at a different wagering game machine (e.g., second wagering game machine 642) may be a very brief time period (e.g., the time it takes to go from one wagering game machine to another), an intermediate time period (e.g., the time for a meal break or to attend a show), or a long time period (e.g., overnight). The embodiments of the invention are not limited to any particular time period. Operations 616-628 represent activities taking place on second wagering game machine 642 that are the same or similar to those activities of operations 602-614 that take place on first wagering game machine 640.

At operation 616, second wagering game machine 642 receives a wager.

At operation 618, second wagering game machine 642 determines a portion of the wager that is to be used to fund a bonus game for the player. As with operation 604, the wagering game machine may use the output of a random number generator to determine if a portion of the wager is to be used to contribute to a bonus game fund. Further, the output may be used in various ways to determine if a portion of the wager is to be used to contribute to a bonus game fund and the amount to be contributed (if any). In some embodiments, the output is used to determine if a contribution is to be made. If a contribution is to be made, then the amount of the contribution may be a fixed contribution, a contribution that is relative to the wager amount, or a contribution that is randomly determined as a percentage of the wager. In alternative embodiments, a contribution may be made with each wager, with the contribution amount determined according to the output of the random number generator.

At operation 620, wagering game machine 642 sends data indicating the portion of the wager that is allocated to the bonus game fund to wagering game server 302.

At operation 622, wagering game server 302 receives the data indicating the portion of the wager to be allocated to the bonus game fund. Bonus game state data 304 (FIG. 3) is updated to indicate the new bonus game fund amount.

Blocks 616-622 may be repeated as the player continues to wager at second wagering game machine 642.

At some point while the player is playing second wagering game machine 642, at operation 624 a bonus trigger event may occur. Upon occurrence of the event, a bonus game is commenced and displayed to the user.

In response to the bonus game trigger, at operation 626, wagering game server 302 updates a presentation layer for the bonus game. As discussed above, elements within the presentation layer may have attributes that are adjusted according to the size of the bonus game fund. The updated presentation layer is then sent to the wagering game.

At operation 628, second wagering game machine 642 receives the updated presentation layer. If the bonus game is still currently active on second wagering game machine 642, the wagering game machine displays the presentation layer on a display of the wagering game machine. If the bonus game is not currently active (e.g., the base wagering game is currently active), then the presentation layer may be held until the bonus game is triggered again.

Operations 614-628 may be repeated as the player continues to place wagers at second wagering game machine 642.

While operations 602-614 and 616-628 have been illustrated as operating on two wagering game machines, it should be noted that the operations 602-614 could be repeated on any number of wagering game machines. For example, after wagering at second wagering game machine 642, a player may proceed to a third, fourth and fifth wagering game machine with operations similar to 602-614 being repeated at each of the successive wagering game machines. The embodiments of the invention are not limited to operations at any particular number of wagering game machines.

At operation 630, a bonus award event occurs. In some embodiments, the bonus award event may be determined based on the outcome of a random number generator. In alternative embodiments, the bonus award event may occur when the bonus game fund amount reaches a particular level. This occurrence may be reflected in the presentation layer. For example, the crops may reach a size at which they are reaped, a fish may grow to a certain size, a race car may complete a race course etc. Other bonus award events are possible and within the scope of the inventive subject matter.

At block 632, the bonus game fund is awarded to the player. In some embodiments, the player is credited an amount corresponding to the bonus game award on a credit meter of the wagering game.

FIGS. 6-12 illustrate example screen images of a presentation layer for a crop themed bonus game and associated base wagering game that illustrate the operation of the above-described system and method.

Figure 7:
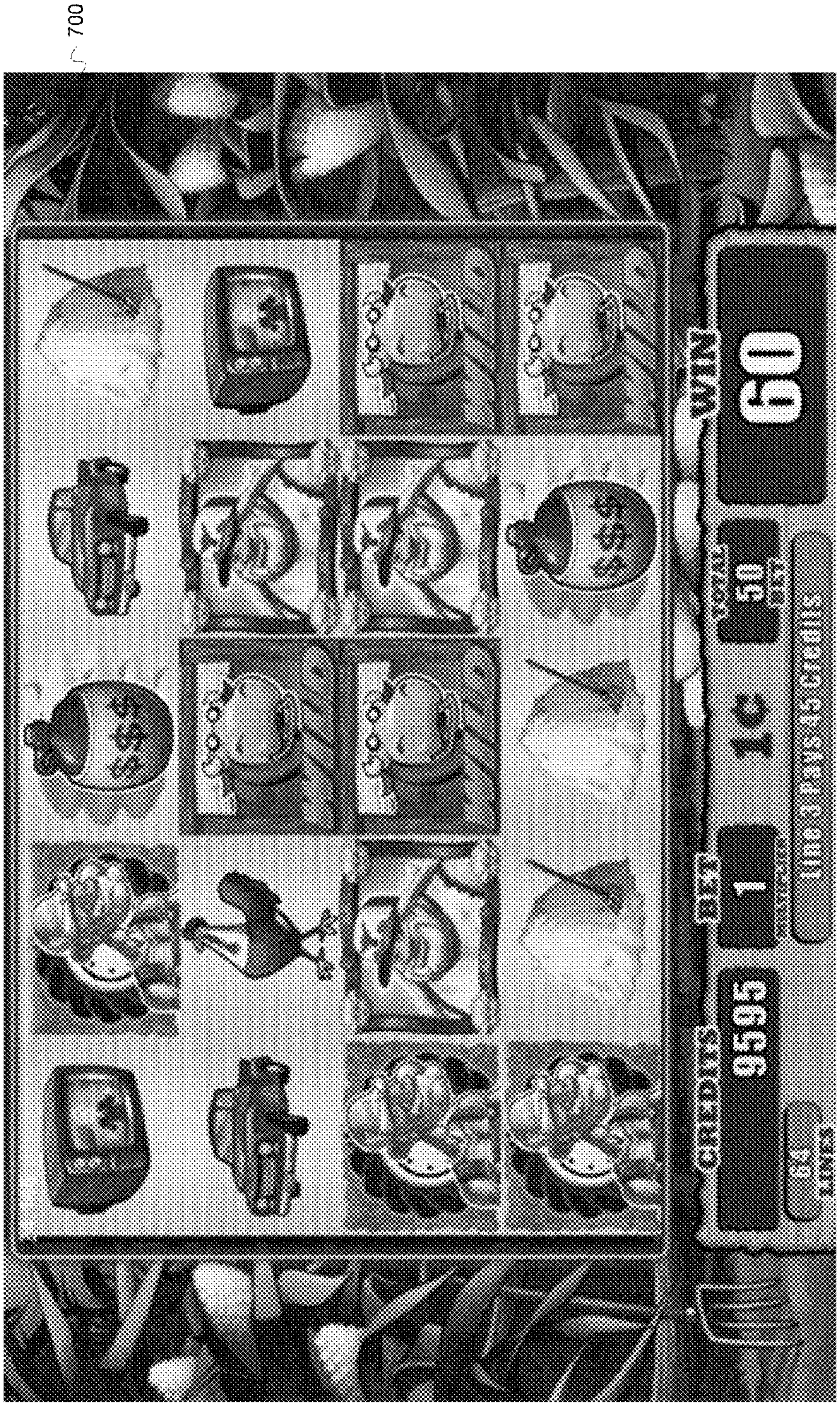
FIGS. 7-13 are example screen images for a bonus game according to embodiments.

FIG. 7 is an example screen image 700 of a base wagering game having a farm theme that is associated with a crop based bonus game. As the player wagers, a portion of the wager may be allocated to a bonus game fund. At some point, the crop based bonus game is triggered. As discussed above, the crop based bonus game may be triggered by the appearance of a symbol or set of symbols that are randomly determined. Alternatively, the bonus game may be triggered by a "mystery" trigger.

Figure 8:
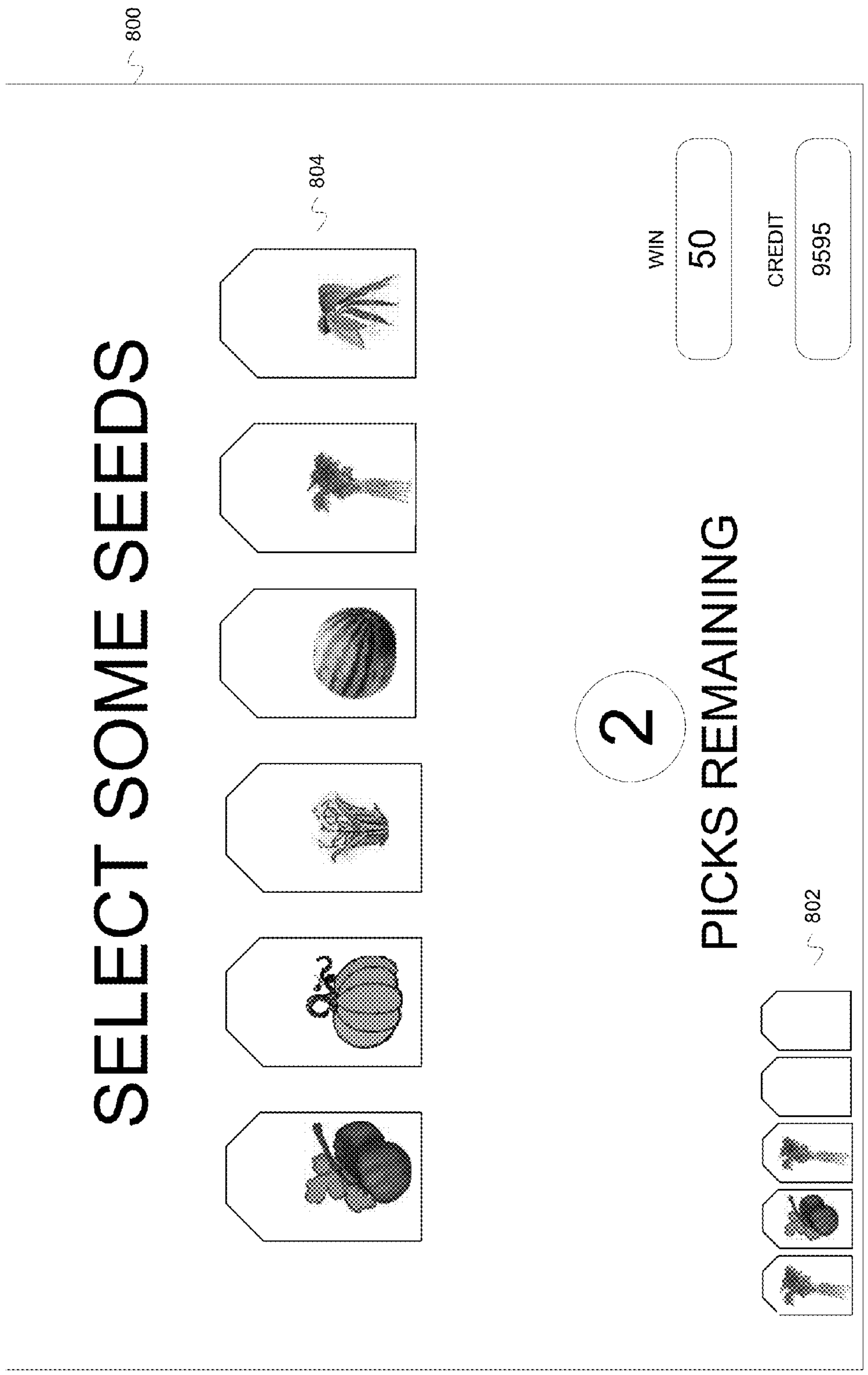

FIG. 8 is an example screen image of a seed selection screen 800 for a crop based bonus game. Example screen 800 includes a seed selection area 802 and a selected seeds area 804. Seed selection area provides a set of seeds that may be selected to plant in virtual plots. Selected seeds area 804 identifies the seeds that a player has selected. In the example shown, the player has selected three types of seeds for planting and has two selections remaining. The number of selections made available to a player may vary according to the size of the bonus game fund.

Figure 9:
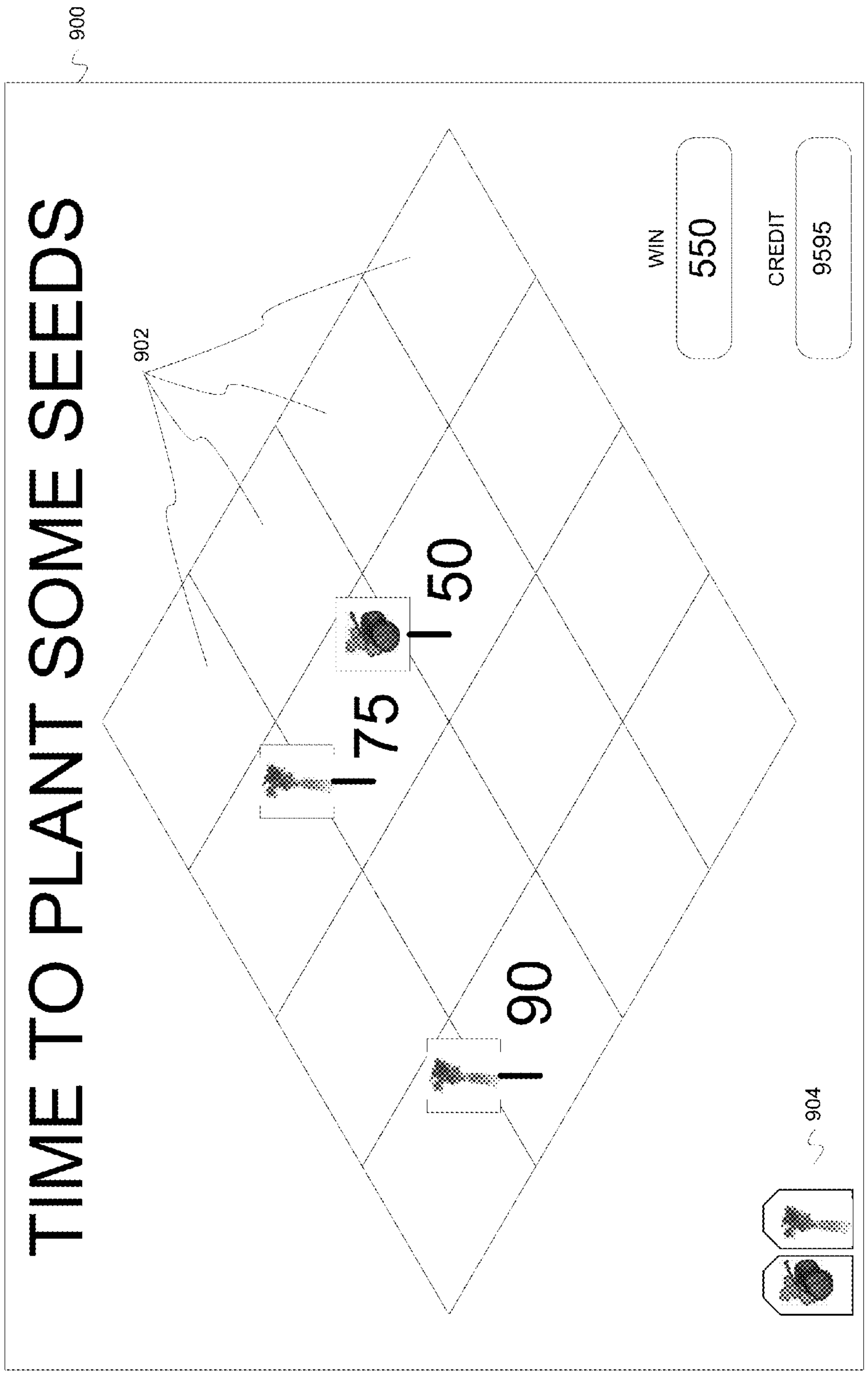

FIG. 9 is an example screen image of a plot selection screen 900 for a crop based bonus game. A player selects a seed from seed selection area 804 that comprises the seeds selected using the interface described above with respect to FIG. 8. The player also selects a plot 802 to plant the selected seed. In some embodiments, bonus credits are associated with each plot. The amount of the bonus credit may be randomly determined. As a player selects a type of seed to plant in a plot, the bonus amount for the plot is revealed to the player. In the example shown, the player has selected three plots with bonus amounts worth 90, 75 and 50 credits, and has two selections remaining. After the player has selected plots, in some embodiments, the player is returned to the base wagering game.

Figure 10:
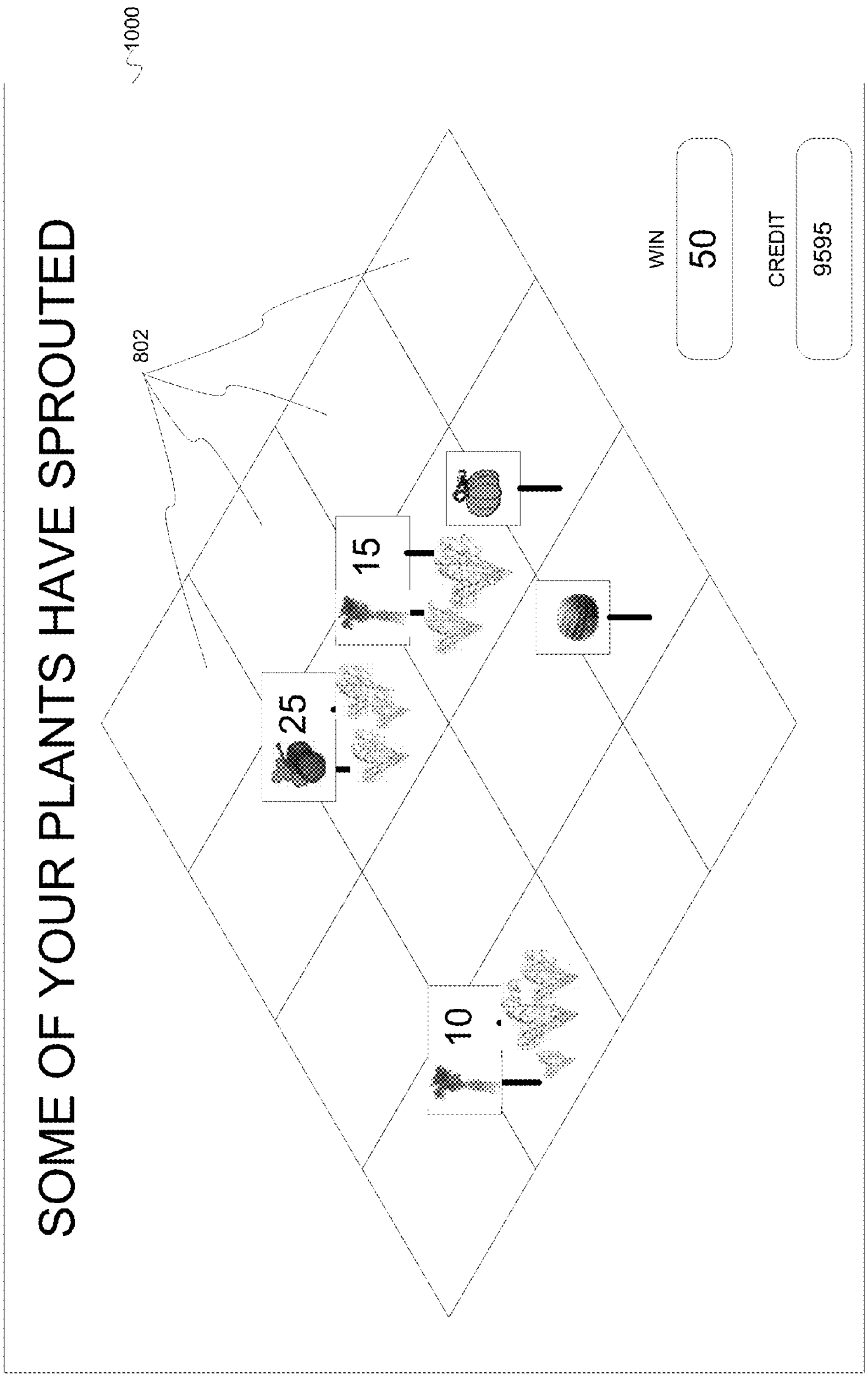

FIG. 10 is an example screen image of a sprouted plant screen 1000 for the crop based bonus game. As the player plays the base wagering game, the wagering game determines a portion of the wager to allocate to the bonus game. At some point in time, the crop based bonus game is retriggered. Sprouted plant screen 1000 is an example of a screen of the crop based bonus game that reflects the growth of selected plants. The growth of plants in the crop based bonus game is based on the growth of the bonus game fund as portions of a player's wagers in the base wagering game are allocated to the bonus game fund for the crop based bonus game. In the example illustrated in FIG. 10, three of the plots have had plants sprout. Further, bonus credits have been awarded from the bonus game fund for the three plots in the amounts of 10, 25 and 15 credits. The crop based bonus game may display a seed selection screen 800 and plot selection screen 900 that provides the player an opportunity to add seeds to the plots in the player's crop based bonus game.

Figure 11:

FIG. 11 is an example screen image of a bonus game progress screen 1100. In some embodiments, at various points during play of a base wagering game, a player may be informed of a status of their crop based bonus game. The bonus game progress screen 1100 need not trigger the crop based bonus game; rather the bonus game progress screen informs the player that the bonus game has progressed in some way while they are playing the base wagering game.

Figure 12:
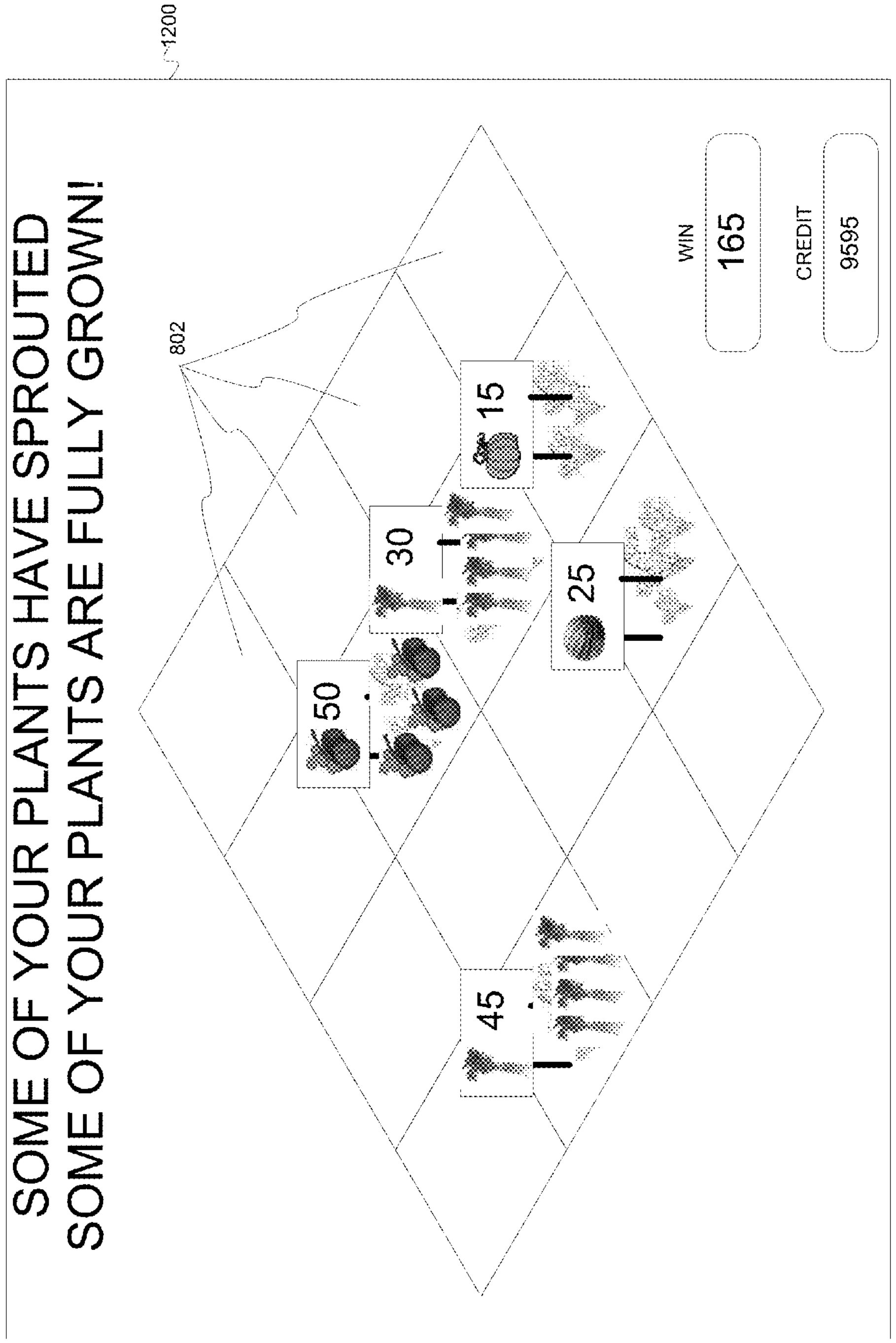

FIG. 12 is an example screen image of a mature plants screen 1200. As the player wagers during the base wagering game, portions of some of the wagers may continue to be allocated to the bonus game fund for the player's crop bonus game. At some point during the play of the base wagering game, the crop bonus game is triggered again. If plants have matured, then mature plants screen 1200 is displayed as part of the crop based bonus game. In the example shown, some crops have matured having bonus amounts of 45, 50 and 30 credits. Further, some crops have sprouted having bonus amounts of 25 and 15 credits. The credits for crops maturing may be determined in accordance with the amount in the bonus game fund and apportioned to various crops in accordance with the output of a random number generator. Mature crops may be harvested, which results in the plots being made available for replanting in future rounds of the crop based bonus game.

Figure 13:
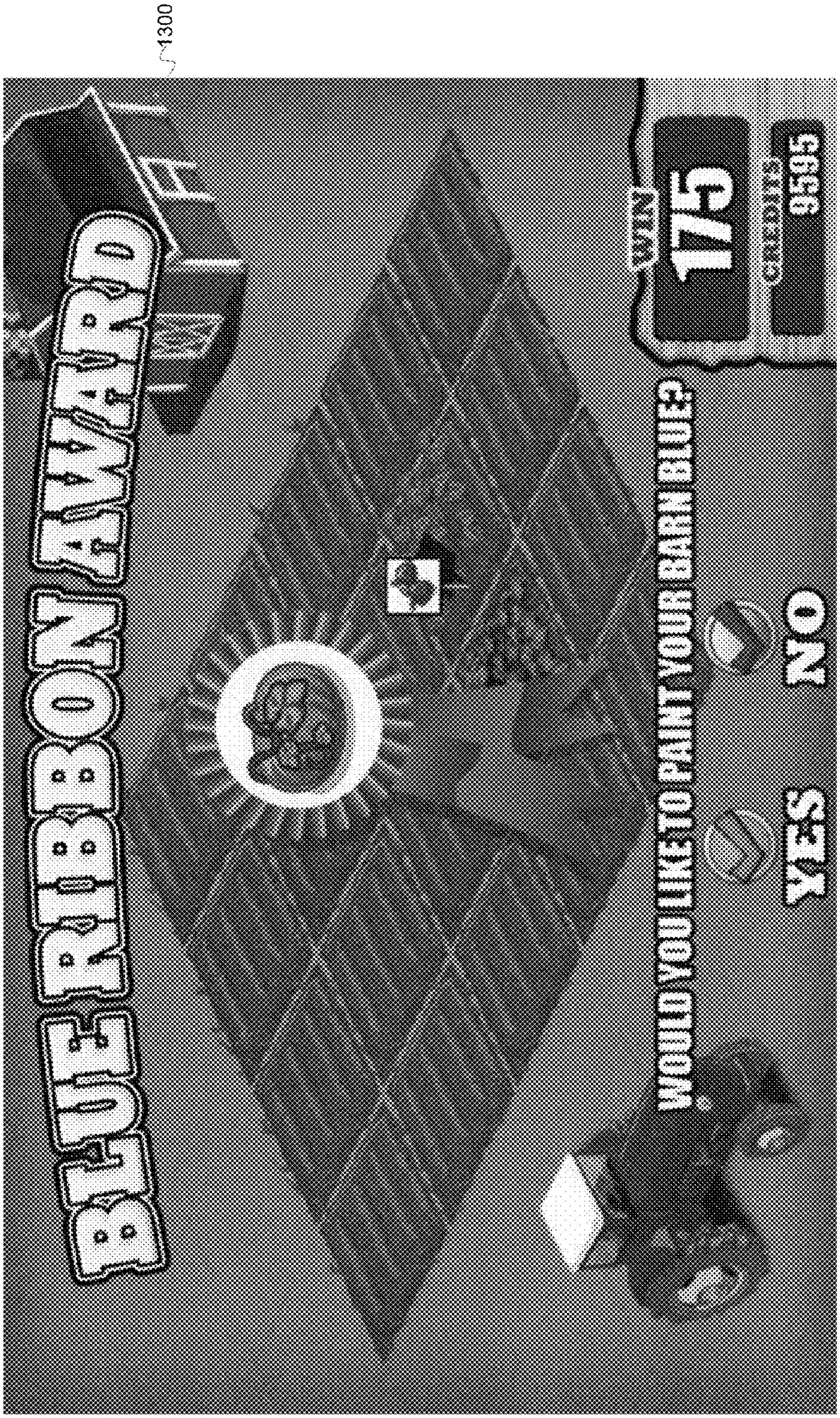

FIG. 13 is an example screen image of a random prize screen 1300 for the crop based bonus game. In some embodiments, after mature crops are harvested, the player becomes eligible for a randomly awarded prize. The randomly awarded prize may comprise a secondary bonus. Examples of such secondary bonuses may be the ability to add game elements such as barns, tractors, animals etc. The secondary bonus may comprise the ability to customize a game element. In the example shown, the player is provided the opportunity to customize the color of a barn.

FIGS. 7-13 have been discussed in the context of an example crop based bonus game. Those of skill in the art having the benefit of the disclosure will appreciate that the concepts discussed in the examples provided above may be applied to other bonus game themes.

Numerous variations on the systems and methods may be provided in further alternative embodiments. For example, in some embodiments, a base wagering game and a bonus game may be simultaneously displayed on a wagering game machine. The base wagering game may be displayed on a primary display of the wagering game machine and the bonus game may be displayed on a secondary display (e.g., a top box display) of the wagering game machine. As described above, a portion of some of the wagers may be allocated to the bonus game fund. Additionally, the portion allocated to the bonus game fund may be divided into a first portion and a second portion. The first portion may be used to cause adjustment in attributes (size, color, etc.) of elements while the bonus game is displayed. The second portion may be used to cause adjustment in attributes of bonus game elements while the bonus game is not displayed (e.g., while the player is away from a wagering game machine).

In some embodiments, an online game server may be part of a system that provides a distributed bonus feature. The online game server serves non-wagering games to client devices outside of a physical casino environment. A client device may be a personal computer, laptop computer, tablet computer or mobile device such as a mobile phone. The online game server may also provide online wagering games in jurisdictions that allow online wagering. The non-wagering games may operate similarly to wagering games or bonus games available on wagering game located in a casino. In some embodiments, the non-wagering games served by an online game server may provide opportunities for earning game achievements or game elements that appear in a bonus game provided in a casino. As an example, consider the crop based bonus game described above. Through an online server, a player may play a non-wagering version of a wagering game available at a casino. Credits earned during non-wagering game play may be added to casino free play money for use when the player goes to the casino. Some of the crops in the crop based bonus game may represent the free play money, while other crops represent the bonus game fund. For example, carrots in the crop based bonus game may represent casino free play money earned while playing non-wagering games on an online game server, while cabbages represent the bonus game fund that is funded by portions of some of the player's wagers at the casino.

Alternatively, play of a non-wagering game on an online server may allow the player to be rewarded with game elements that appear in the bonus game when the bonus game is triggered during wagering game play at the casino. For example, in the crop based bonus game, a player playing a non-wagering game on an online game server may earn tractors, farm tools etc. that may later appear in the crop based bonus game.

In some embodiments, a bonus game amount may be determined at the time the bonus game is initiated or re-initiated. In such embodiments, the state of various bonus game objects (e.g., crops planted, implements owned) and other aspects of a bonus game may be persistently stored on a wagering game server. Upon determination of the bonus game amount, the objects may be altered to give the impression that they changed from one invocation of the bonus game to the next. For example, in the crop based bonus game, the crops may be displayed to provide the illusion that the crops grew over time while the player was either away from the wagering game machine or was playing a base game on the wagering game machine.

Regardless of how a bonus game amount is determined and funded, the wagering game machine may analyze the current persistent state of the bonus game to determine how a bonus game amount is to be presented to a player. Again, using the crop based bonus game as an example, different players may make different choices in how to play the bonus game. Further, players may make changes to the persistent state of a bonus game during casual play in a non-wagering game environment. The bonus game analyzes the persistent state of the game to determine how the bonus game amount is to be awarded. For example, one player may have planted crops. As discussed above, the crops can be made to appear to grow in successive invocations of the bonus game. Another player may have chosen to obtain a tractor instead of planting crops. In this example, there are no crops to "grow" so the bonus game determines another way to award the bonus game amount. For example, the player may be awarded a "best tractor" award. A third player may have chosen to plant one crop (e.g., corn) during an invocation of a bonus game, but later changes the crop (e.g., to wheat) during casual play at a non-wagering game. In this example, the bonus game awards a bonus amount based on the wheat crop instead of the corn crop that was initially planted in the bonus game. Thus the same bonus game amount may be presented in various ways depending on the current state of a player's bonus game.

Operating Environment

This section describes an example operating environment and presents structural aspects of some embodiments. This section includes discussion about wagering game machine architectures and wagering game networks.

Wagering Game Machine Architectures

Figure 14:
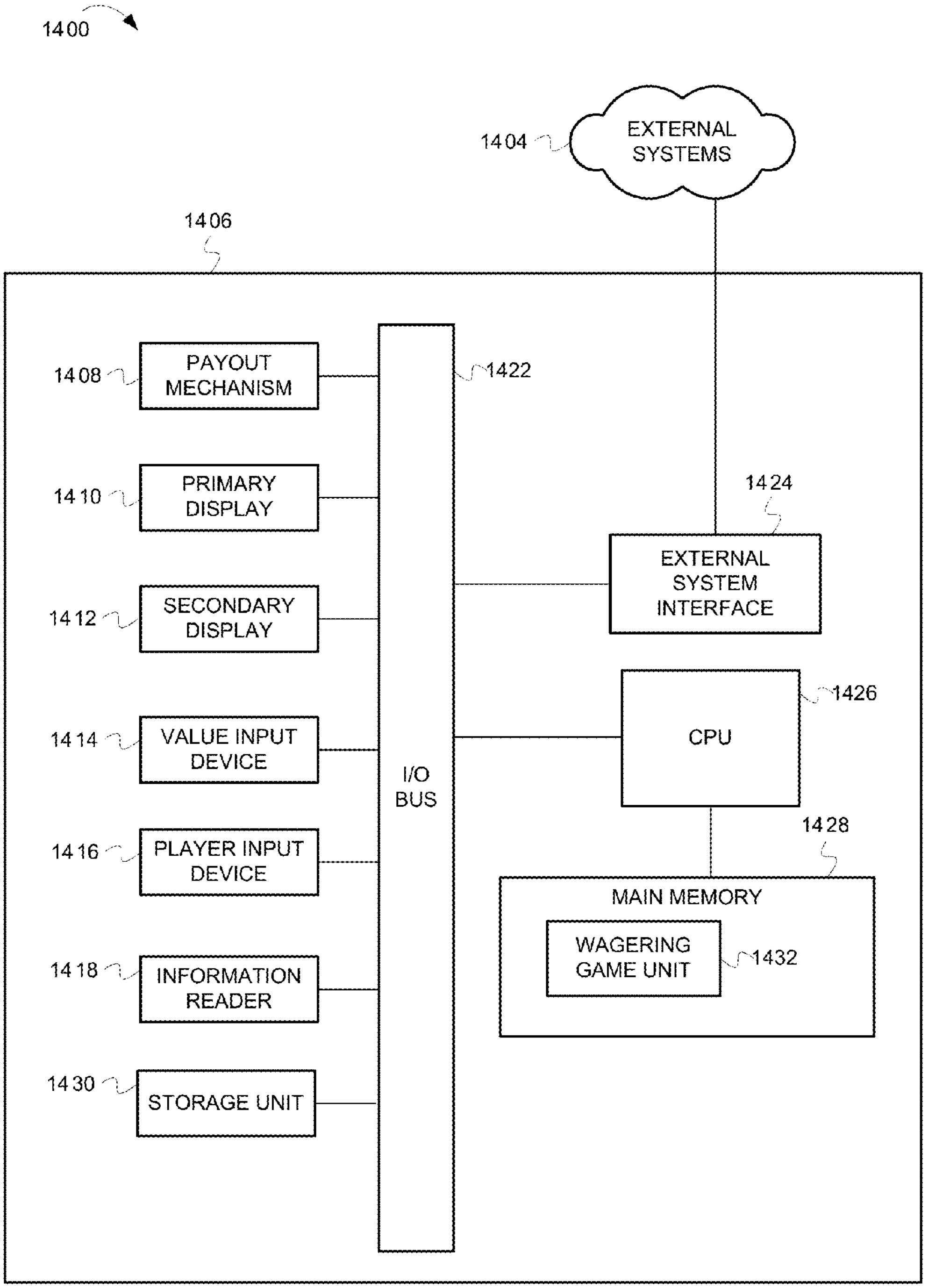
FIG. 14 is a block diagram illustrating a wagering game machine architecture.

FIG. 14 is a block diagram illustrating a wagering game machine architecture, according to example embodiments of the invention. As shown in FIG. 14, the wagering game machine architecture 1400 includes a wagering game machine 1406, which includes a central processing unit (CPU) 1426 connected to main memory 1428. The CPU 1426 can include any suitable processor, such as an Intel® Pentium processor, Intel® Core 2 Duo processor, AMD Opteron™ processor, or UltraSPARC processor. The main memory 1428 includes a wagering game unit 1432. In one embodiment, the wagering game unit 1432 can present wagering games, such as video poker, video black jack, video slots, video lottery, etc., in whole or part.

The CPU 1426 is also connected to an input/output (I/O) bus 1422, which can include any suitable bus technologies, such as an AGTL+ frontside bus and a PCI backside bus. The I/O bus 1422 is connected to a payout mechanism 1408, primary display 1410, secondary display 1412, value input device 1414, player input device 1416, information reader 1418, and storage unit 1430. The player input device 1416 can include the value input device 1414 to the extent the player input device 1416 is used to place wagers. The I/O bus 1422 is also connected to an external system interface 1424, which is connected to external systems 1404 (e.g., wagering game networks).

In one embodiment, the wagering game machine 1406 can include additional peripheral devices and/or more than one of each component shown in FIG. 14. For example, in one embodiment, the wagering game machine 1406 can include multiple external system interfaces 1424 and/or multiple CPUs 1426. In one embodiment, any of the components can be integrated or subdivided.

Any component of the architecture 1400 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 14 describes an example wagering game machine architecture, this section continues with a discussion wagering game networks.

Wagering Game Networks

Figure 15:
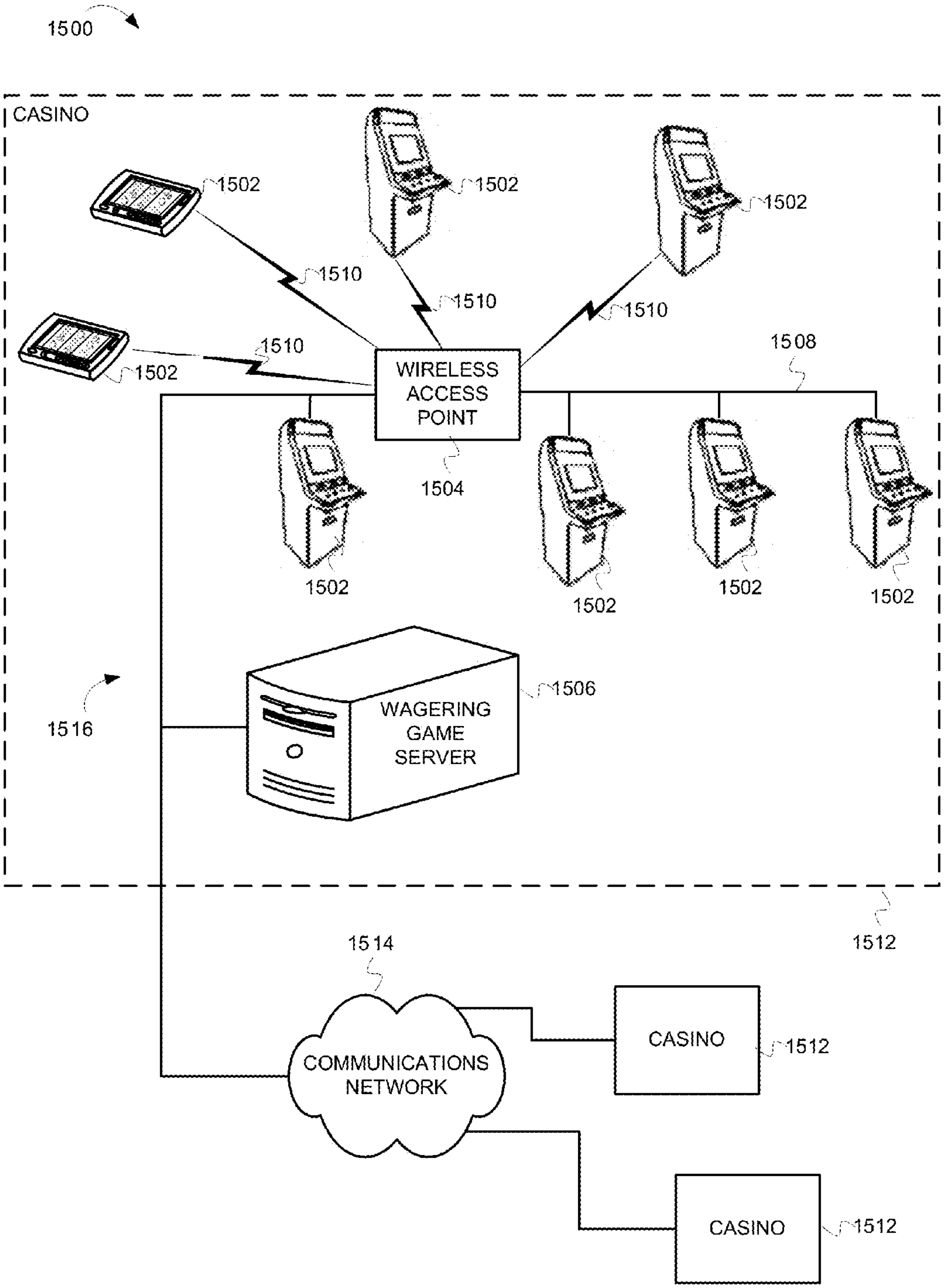
FIG. 15 is a block diagram illustrating a wagering game network.

FIG. 15 is a block diagram illustrating a wagering game network 1500, according to example embodiments of the invention. As shown in FIG. 15, the wagering game network 1500 includes a plurality of casinos 1512 connected to a communications network 1514.

Each casino 1512 includes a local area network 1516, which includes an access point 1504, a wagering game server 1506, and wagering game machines 1502. The access point 15304 provides wireless communication links 1510 and wired communication links 1508. The wired and wireless communication links can employ any suitable connection technology, such as Bluetooth, 802.11, Ethernet, public switched telephone networks, SONET, etc. In some embodiments, the wagering game server 1506 can serve wagering games and distribute content to devices located in other casinos 1512 or at other locations on the communications network 1514.

The wagering game machines 1502 described herein can take any suitable form, such as floor standing models, handheld mobile units, bartop models, workstation-type console models, etc. Further, the wagering game machines 1502 can be primarily dedicated for use in conducting wagering games, or can include non-dedicated devices, such as mobile phones, personal digital assistants, personal computers, etc. In one embodiment, the wagering game network 1500 can include other network devices, such as accounting servers, wide area progressive servers, player tracking servers, and/or other devices suitable for use in connection with embodiments of the invention.

In some embodiments, wagering game machines 1502 and wagering game servers 1506 work together such that a wagering game machine 1502 can be operated as a thin, thick, or intermediate client. For example, one or more elements of game play may be controlled by the wagering game machine 1502 (client) or the wagering game server 1506 (server). Game play elements can include executable game code, lookup tables, configuration files, game outcome, audio or visual representations of the game, game assets or the like. In a thin-client example, the wagering game server 1506 can perform functions such as determining game outcome or managing assets, while the wagering game machine 1502 can present a graphical representation of such outcome or asset modification to the user (e.g., player). In a thick-client example, the wagering game machines 1502 can determine game outcomes and communicate the outcomes to the wagering game server 1506 for recording or managing a player's account.

In some embodiments, either the wagering game machines 1502 (client) or the wagering game server 1506 can provide functionality that is not directly related to game play. For example, account transactions and account rules may be managed centrally (e.g., by the wagering game server 1506) or locally (e.g., by the wagering game machine 1502). Other functionality not directly related to game play may include power management, presentation of advertising, software or firmware updates, system quality or security checks, etc.

Any of the wagering game network components (e.g., the wagering game machines 1502) can include hardware and machine-readable media including instructions for performing the operations described herein.

Example Wagering Game Machines

Figure 16:
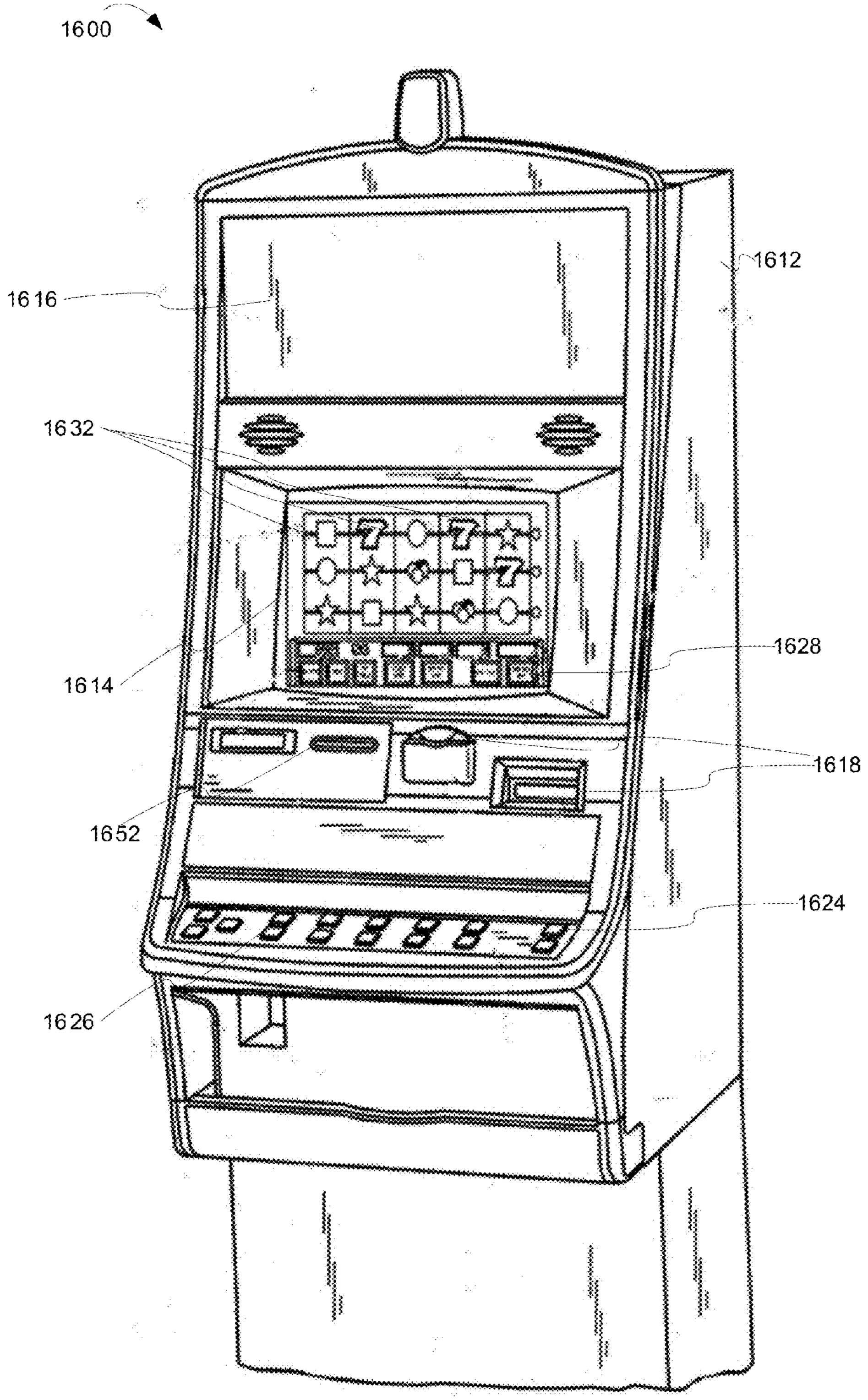
FIG. 16 is a perspective view of a wagering game machine.

FIG. 16 is a perspective view of a wagering game machine, according to example embodiments of the invention. Referring to FIG. 16, a wagering game machine 1600 is used in gaming establishments, such as casinos. According to embodiments, the wagering game machine 1600 can be any type of wagering game machine and can have varying structures and methods of operation. For example, the wagering game machine 1600 can be an electromechanical wagering game machine configured to play mechanical slots, or it can be an electronic wagering game machine configured to play video casino games, such as blackjack, slots, keno, poker, blackjack, roulette, etc.

The wagering game machine 1600 comprises a housing 1612 and includes input devices, including value input devices 1618 and a player input device 1624. For output, the wagering game machine 1600 includes a primary display 1614 for displaying information about a basic wagering game. The primary display 1614 can also display information about a bonus wagering game and a progressive wagering game. The wagering game machine 1600 also includes a secondary display 1616 for displaying wagering game events, wagering game outcomes, and/or signage information. While some components of the wagering game machine 1600 are described herein, numerous other elements can exist and can be used in any number or combination to create varying forms of the wagering game machine 1600.

The value input devices 1618 can take any suitable form and can be located on the front of the housing 1612. The value input devices 1618 can receive currency and/or credits inserted by a player. The value input devices 1618 can include coin acceptors for receiving coin currency and bill acceptors for receiving paper currency. Furthermore, the value input devices 1618 can include ticket readers or barcode scanners for reading information stored on vouchers, cards, or other tangible portable storage devices. The vouchers or cards can authorize access to central accounts, which can transfer money to the wagering game machine 1600.

The player input device 1624 comprises a plurality of push buttons on a button panel 1626 for operating the wagering game machine 1600. In addition, or alternatively, the player input device 1624 can comprise a touch screen 1628 mounted over the primary display 1614 and/or secondary display 1616.

The various components of the wagering game machine 1600 can be connected directly to, or contained within, the housing 1612. Alternatively, some of the wagering game machine's components can be located outside of the housing 1612, while being communicatively coupled with the wagering game machine 1600 using any suitable wired or wireless communication technology.

The operation of the basic wagering game can be displayed to the player on the primary display 1614. The primary display 1614 can also display a bonus game associated with the basic wagering game. The primary display 1614 can include a cathode ray tube (CRT), a high resolution liquid crystal display (LCD), a plasma display, light emitting diodes (LEDs), or any other type of display suitable for use in the wagering game machine 1600. Alternatively, the primary display 1614 can include a number of mechanical reels to display the outcome. In FIG. 16, the wagering game machine 1600 is an "upright" version in which the primary display 1614 is oriented vertically relative to the player. Alternatively, the wagering game machine can be a "slant-top" version in which the primary display 1614 is slanted at about a thirty-degree angle toward the player of the wagering game machine 1600. In yet another embodiment, the wagering game machine 1600 can exhibit any suitable form factor, such as a free standing model, bartop model, mobile handheld model, or workstation console model.

A player begins playing a basic wagering game by making a wager via the value input device 1618. The player can initiate play by using the player input device's buttons or touch screen 1628. The basic game can include arranging a plurality of symbols along a payline 1632, which indicates one or more outcomes of the basic game. Such outcomes can be randomly selected in response to player input. At least one of the outcomes, which can include any variation or combination of symbols, can trigger a bonus game.

In some embodiments, the wagering game machine 1600 can also include an information reader 1652, which can include a card reader, ticket reader, bar code scanner, RFID transceiver, or computer readable storage medium interface. In some embodiments, the information reader 1652 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A method of operating a gaming system primarily dedicated to playing a casino wagering game, the gaming system including a housing, a random number generator, an electronic display device, and an electronic input device, the electronic display device and the electronic input device being coupled to the housing, the method comprising:

initiating a first wagering game session on a first wagering game machine, the first wagering game session associated with a player in accordance with one of a player tracking identification and an account identification of the player;

receiving into a computer-readable medium, data representing one or more wagers during the first wagering game session;

determining by one or more processors, a portion of the one or more wagers;

allocating, by the one or more processors, the portion to a bonus game fund personal to the player, the bonus game fund personal to the player having an available portion and a reserved portion;

in response to determining a first bonus game entry event during the first wagering game session, displaying one or more elements of a bonus game presentation layer for a bonus game, wherein a graphical attribute of the one or more elements is determined, based at least in part, on an amount of the available portion;

initiating a second wagering game session after the first wagering game session, the second wagering game session associated with the player in accordance with one of the player tracking identification and the account identification of the player; and in response to determining a second bonus game entry event during the second wagering game session, displaying the one or more elements of the bonus game presentation layer, wherein the graphical attribute of the one or more elements is determined, based at least in part, on an amount of the reserved portion.

2. The method of claim 1, and further comprising:

receiving input indicating selection by the player of the one or more elements, wherein selection of the one or more elements indicates inclusion of the one or more elements in the bonus game presentation layer; and storing the selection of the one or more elements as part of a game state for access during the second wagering game session.

3. The method of claim 2, wherein displaying the one or more elements of the bonus game presentation layer includes adding one or more additional elements to the bonus game presentation layer based, at least in part, on one of the amount of the available portion and the amount of the reserved portion.

4. The method of claim 2, wherein displaying the one or more elements in the bonus game presentation layer modifying an attribute of the one or more elements in the bonus game presentation layer based, at least in part, on one of the amount of the available portion and the amount of the reserved portion.

5. The method of claim 4, wherein the graphical attribute comprises a size attribute, a color attribute, or a texture attribute.

6. The method of claim 1, wherein determining the portion of the one or more wagers includes determining a portion in accordance with the output of the random number generator.

7. The method of claim 1, further comprising, in response to determining a bonus game award event, awarding the bonus game fund, wherein the bonus game award event comprises the bonus game fund reaching a predetermined or configurable level.

8. The method of claim 2, wherein the bonus game includes a wagering mode and a non-wagering mode, and wherein a first subset of the one or more elements are modified during the non-wagering mode and wherein a second subset of the one or more elements are modified during the wagering mode.

9. A gaming system primarily dedicated to playing a casino wagering game, the system comprising:

a wagering game server configured to store bonus game state data for a bonus game, the bonus game state data personal to a player and a bonus game fund personal to the player, the wagering game server further configured to maintain an available portion of the bonus game fund and a reserved portion of the bonus game fund;

a first wagering game machine having a housing, a random number generator, an electronic display device, and an electronic input device, the electronic display device and the electronic input device being coupled to the housing, the first wagering game machine configured to present a first wagering game upon which monetary value may be wagered and further configured to:

initiate a first wagering game session, the first wagering game session associated with the player in accordance with one of a player tracking identification and an account identification of the player, determine portions of one or more wagers during the first wagering game session to be allocated for a bonus game fund for the bonus game, the bonus game fund personal to the player, and send data indicating the portions of the one or more during the first wagering game session to the wagering game server; and a second wagering game machine configured to present a second wagering game upon which monetary value may be wagered and further configured to:

initiate a second wagering game session, the second wagering game session associated with the player in accordance with one of the player tracking identification and an account identification of the player, determine portions of one or more wagers during the second wagering game session to be allocated for the bonus game fund personal to the player for the bonus game, and send data indicating the portions of the one or more wagers during the second wagering game session to the wagering game server; and a presentation layer for the bonus game, the presentation layer including one or more elements;

wherein response to a determination of a first bonus game entry event during the first wagering game session, the one or more elements of the presentation layer are determined, based at least in part, on an amount of the available portion;

wherein response to a determination of a second bonus game entry event during the second wagering game session, the one or more elements of the presentation layer are determined, based at least in part, in an amount of the reserved portion.

10. The system of claim 9, wherein an attribute of the one or more elements displayed in the presentation layer is modified according to one of the amount of the available portion of the bonus game fund and the amount of the reserved portion of the bonus game fund.

11. The system of claim 9, wherein at least one element is added to the one or more elements or removed from the one or more elements according to one of the amount of the available portion of the bonus game fund and the amount of the reserved portion of the bonus game fund.

12. The system of claim 9, wherein a bonus game award event comprises the bonus game fund reaching a predetermined or configurable level.

13. One or more non-transitory computer-readable media having stored thereon computer executable instructions for causing one or more processors to perform operations comprising:

initiating a first wagering game session on a first wagering game machine, the first wagering game session associated with a player in accordance with one of a player tracking identification and an account identification of the player;

receiving data representing one or more wagers during the first wagering game session;

determining a portion of the one or more wagers to be allocated to a bonus game fund personal to the player, the bonus game fund personal to the player having an available portion and a reserved portion;

in response to determining a first bonus game entry event during the first wagering game session, displaying one or more elements of a bonus game presentation layer for a bonus game, wherein a graphical attribute of the one or more elements is determined, based at least in part, on an amount of the available portion;

initiating a second wagering game session after the first wagering game session, the second wagering game session associated with the player in accordance with one of the player tracking identification and the account identification of the player; and in response to determining a second bonus game entry event during the second wagering game session, displaying the one or more elements of the bonus game presentation layer, wherein the graphical attribute of the one or more elements is determined, based at least in part, on an amount of the reserved portion.

14. The one or more non-transitory computer-readable media of claim 13, wherein the operations further comprise:

receiving input indicating selection by the player of the one or more elements, wherein selection of the one or more elements indicates inclusion of the one or more elements in the bonus game presentation layer; and storing the selection of the one or more elements as part of a game state for access during the second wagering game session.

15. The one or more non-transitory computer-readable media of claim 14, wherein displaying the one or more elements of the bonus game presentation layer includes adding at least one element to the one or more elements displayed on the bonus game presentation layer based, at least in part, on one of the amount of the available portion and the amount of the reserved portion.

16. The one or more non-transitory computer-readable media of claim 14, wherein displaying the one or more elements of the presentation layer includes modifying an attribute of at least one of the one or more elements of the bonus game presentation layer based, at least in part, on one of the amount of the available portion and the amount of the reserved portion.

17. The one or more non-transitory computer-readable media of claim 16, wherein the attribute comprises a size attribute, a color attribute, or a texture attribute.

18. The one or more computer-readable media of claim 13, wherein a bonus game award event comprises the bonus game fund reaching a predetermined or configurable level.

19. The one or more computer-readable media of claim 14, wherein the bonus game includes a wagering mode and a non-wagering mode, and wherein a first subset of the one or more elements are modified during the non-wagering mode and wherein a second subset of the one or more elements are modified during the wagering mode.

* * * * *